United States Patent
Gujarati et al.

(10) Patent No.: US 12,481,904 B2
(45) Date of Patent: Nov. 25, 2025

(54) CIRCUIT REDUCTION FOR EXPONENTIALS OF PAULI OPERATORS

(71) Applicants: International Business Machines Corporation, Armonk, NY (US); The Boeing Company, Chicago, IL (US)

(72) Inventors: Tanvi Pradeep Gujarati, San Jose, CA (US); Mario Motta, San Jose, CA (US); Julia Elizabeth Rice, Sunnyvale, CA (US); Nam Hoang Nguyen, Anaheim, CA (US)

(73) Assignees: INTERNATIONAL BUSINESS MACHINES CORPORATION, Armonk, NY (US); THE BOEING COMPANY, Chicago, IL (US)

( * ) Notice: Subject to any disclaimer, the term of this patent is extended or adjusted under 35 U.S.C. 154(b) by 667 days.

(21) Appl. No.: 17/819,681

(22) Filed: Aug. 15, 2022

(65) Prior Publication Data
US 2024/0054375 A1    Feb. 15, 2024

(51) Int. Cl.
*G06N 10/20* (2022.01)

(52) U.S. Cl.
CPC .................. *G06N 10/20* (2022.01)

(58) Field of Classification Search
USPC ........................................................ 716/104
See application file for complete search history.

(56) References Cited

U.S. PATENT DOCUMENTS

| | | |
|---|---|---|
| 9,819,347 B2 | 11/2017 | Hastings et al. |
| 10,922,457 B2 | 2/2021 | Nam et al. |
| 11,144,689 B1 | 10/2021 | Cowtan et al. |

(Continued)

OTHER PUBLICATIONS

Van De Wetering, "Constructing quantum circuits with global gates," New J. Phys. 23 (Apr. 7, 2021) 043015, Published by IOP Publishing Ltd on behalf of the Institute of Physics and Deutsche Physikalische Gesellschaft, https://doi.org/10.1088/1367-2630/abf1b3.

(Continued)

*Primary Examiner* — Bryce M Aisaka
(74) *Attorney, Agent, or Firm* — Amin, Turocy & Watson, LLP

(57) ABSTRACT

Systems, computer-implemented methods, and/or computer program products to facilitate reduction of a quantum circuit are provided. A computer-implemented method can comprise performing, by a system operatively coupled to at least one processor, decomposition of an exponential of a first Pauli operator of 1 to n Pauli operators of the quantum circuit, and performing, by the system, a first Clifford transformation of a primary operator of the quantum circuit, where the primary operator can comprise a linear combination of primary Pauli operators, and where the first Clifford transformation can employ a result of the decomposition. Performing the decomposition can comprise decomposing the exponential of the first Pauli operator into a first non-Clifford operator and a first Clifford operator, with the first Clifford operator being employed for the first Clifford transformation. Additional decompositions and respective transformations can be performed iteratively until decomposition of all exponentials of the 1 to n Pauli operators.

20 Claims, 18 Drawing Sheets

(56) References Cited

U.S. PATENT DOCUMENTS

| | | | |
|---|---|---|---|
| 2021/0272000 A1 | 9/2021 | van den Berg et al. | |
| 2021/0287761 A1 | 9/2021 | Camps et al. | |
| 2021/0374586 A1* | 12/2021 | Kliuchnikov | ........ H03K 19/195 |

OTHER PUBLICATIONS

Qassim, et al., "Clifford recompilation for faster classical simulation of quantum circuits," arXiv:1902.02359v2 [quant-ph] Jul. 19, 2019, Department of Physics and Astronomy, University of Waterloo, Waterloo.

Peruzzo, et al., "A variational eigenvalue solver on a photonic quantum processor," Nature Communications vol. 5, Article No. 4213 (Published: Jul. 23, 2014).

Farhi, et al., "A Quantum Approximate Optimization Algorithm," arXiv:1411.4028v1 [quant-ph] Nov. 14, 2014.

Lloyd, "Universal quantum simulators," Science, Aug. 23, 1996, vol. 273, Issue 5278, pp. 1073-1078.

Suzuki, "General theory of fractal path integrals with applications to many-body theories and statistical physics," J. Math. Phys. 32, 400 (1991); https://doi.org/10.1063/1.529425.

Van Den Berg, et al., "Circuit optimization of Hamiltonian simulation by simultaneous diagonalization of Pauli clusters," arXiv:2003.13599v2 [quant-ph] Sep. 5, 2020.

Nam, et al., "Ground-state energy estimation of the water molecule on a trapped ion quantum computer," arXiv:1902.10171v2 [quant-ph] Mar. 7, 2019.

Gokhale, et al., "Quantum Fan-out: Circuit Optimizations and Technology Modeling," arXiv:2007.04246v1 [quant-ph] Jul. 8, 2020.

Hastings, et al., "Improving Quantum Algorithms for Quantum Chemistry," arXiv:1403.1539v2 [quant-ph] Mar. 23, 2014.

Jaderberg, et al., "Minimum Hardware Requirements for Hybrid Quantum-Classical DMFT," arXiv:2002.04612v2 [quant-ph] Jun. 18, 2020.

Bravyi, et al., "Clifford Circuit Optimization with Templates and Symbolic Pauli Gates," arXiv:2105.02291v2 [quant-ph] Nov. 11, 2021.

Bravyi, et al., "6-qubit Optimal Clifford Circuits," arXiv:2012.06074v1 [quant-ph] Dec. 11, 2020.

Nam, et al, "Automated optimization of large quantum circuits with continuous parameters," npj Quantum Information vol. 4, Article No. 23 (Published: May 10, 2018).

Gottesman, "The Heisenberg Representation of Quantum Computers," Group22: Proceedings of the XXII International Colloquium on Group Theoretical Methods in Physics, eds. S. P. Corney, R. Delbourgo, and P. D. Jarvis, pp. 32-43 (Cambridge, MA, International Press, 1999), arXiv:quant-ph/9807006v1 Jul. 1, 1998.

Cowtan, et al., "Phase Gadget Synthesis for Shallow Circuits," EPTCS 318, 2020, pp. 213-228, https://arxiv.org/pdf/1906.01734.pdf.

* cited by examiner

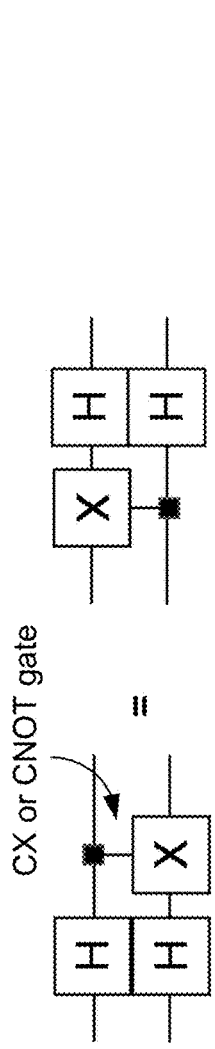
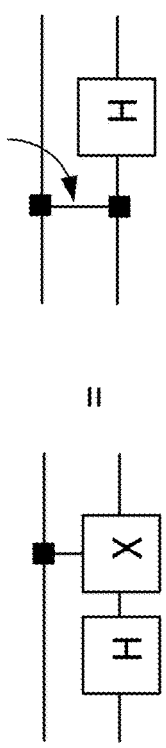
FIG. 7

CIRCUIT REDUCTION FOR EXPONENTIALS OF PAULI OPERATORS

TECHNICAL FIELD

The present disclosure relates to quantum circuits, and more particularly to the reduction of quantum circuits, which can be automatically reduced, such as via use of a quantum and/or classical system.

BACKGROUND

In quantum computing systems and/or in classical computing systems, quantum circuit depth and/or width, type of quantum gates employed and/or total number of quantum gates employed, can attribute to increased system noise and thus can lead to estimation error in resulting measurements.

SUMMARY

The following presents a summary to provide a basic understanding of one or more embodiments described herein. This summary is not intended to identify key or critical elements, or to delineate any scope of the particular embodiments or any scope of the claims. The sole purpose of the summary is to present concepts in a simplified form as a prelude to the more detailed description that is presented later. In one or more embodiments described herein, devices, systems, computer-implemented methods, apparatus and/or non-transitory computer-readable mediums are described that can facilitate the reduction of quantum circuits, such as for the use and/or execution of such quantum circuits on a quantum and/or classical system.

According to an embodiment, a system can comprise a memory that stores computer executable components, and a processor that executes the computer executable components stored in the memory. The computer executable components can comprise a decomposition component that decomposes an exponential of a first Pauli operator of 1 to n Pauli operators of the quantum circuit, and a transformation component that performs a first Clifford transformation of a primary operator of the quantum circuit. The primary operator can comprise a linear combination of additional Pauli operators. The first Clifford transformation can employ a result of the decomposition of the exponential of the first Pauli operator.

One advantage of use of such system can be overall reduction in cost of execution of a quantum circuit. More particularly, due to reduction of total quantum gate count of the quantum circuit including reduction of CNOT gate count, reduction of circuit width of the quantum circuit, and/or reduction of circuit depth of the quantum circuit, execution time for the quantum circuit can be lowered, noise that can lead to estimation error can be reduced, more efficient use of qubit coherency time can be enabled, and/or reduction of memory and/or power can result. This reduction in cost can be provided as a result of the decomposition of the exponential of the first m-qubit Pauli operator of the 1 to n (m-qubit) Pauli operators.

As used herein, an m-qubit Pauli operator can refer to a Pauli operator for acting on one or more qubits of an m-qubit system.

As used herein, an m-qubit system refers to one which has m number of qubits.

As used herein, circuit width can refer to a number of qubits acted upon with the quantum gates of the quantum circuit.

As used herein, circuit depth can refer to a number of circuit operations (e.g., quantum gates) that cannot be performed in parallel with one another.

According to another embodiment, a computer-implemented method for reducing a quantum circuit can comprise performing, by a system operatively coupled to at least one processor, decomposition of an exponential of a first Pauli operator of 1 to n Pauli operators of the quantum circuit, and performing, by the system, a first Clifford transformation of a primary operator of the quantum circuit, where the primary operator can comprise a linear combination of primary Pauli operators, and where the first Clifford transformation can employ a result of the decomposition of the exponential of the first Pauli operator.

One advantage of use of such method can be overall reduction in cost of execution of a quantum circuit. More particularly, due to reduction of total quantum gate count of the quantum circuit including reduction of CNOT gate count, reduction of circuit width of the quantum circuit, and/or reduction of circuit depth of the quantum circuit, execution time for the quantum circuit can be lowered, noise that can lead to estimation error can be reduced, more efficient use of qubit coherency time can be enabled, and/or reduction of memory and/or power can result. This reduction in cost can be provided as a result of the decomposition of the exponential of the first m-qubit Pauli operator of the 1 to n (m-qubit) Pauli operators.

According to yet another embodiment, a computer program product facilitating a process to reduce a quantum circuit can comprise a non-transitory computer readable storage medium having program instructions embodied therewith. The program instructions can be executable by a processor to cause the processor to perform, by the processor, decomposition of an exponential of a first Pauli operator of 1 to n Pauli operators of the quantum circuit, and to perform, by the processor, a first Clifford transformation of a primary operator of the quantum circuit. The primary operator can comprise a linear combination of primary Pauli operators. The first Clifford transformation can employ a result of the decomposition of the exponential of the first Pauli operator.

One advantage of use of such computer program product can be overall reduction in cost of execution of a quantum circuit. More particularly, due to reduction of total quantum gate count of the quantum circuit including reduction of CNOT gate count, reduction of circuit width of the quantum circuit, and/or reduction of circuit depth of the quantum circuit, execution time for the quantum circuit can be lowered, noise that can lead to estimation error can be reduced, more efficient use of qubit coherency time can be enabled, and/or reduction of memory and/or power can result. This reduction in cost can be provided as a result of the decomposition of the exponential of the first m-qubit Pauli operator of the 1 to n (m-qubit) Pauli operators.

Relative to any of the aforedescribed and/or later described systems, computer-implemented methods and/or computer program products, various other advantages can be realized.

For example, another advantage of the one or more embodiments described herein can be provision of an automated frameworks for reduction of circuit depth, such as highly-used, common quantum algorithms. These can include variational quantum eigen-solvers (VQEs), quantum approximate optimization algorithms (QAOAs), Trotter Formulae, circuit transpilation, and/or the like. As used herein, transpilation can refer to a process of rewriting an input quantum circuit to match a topology of a quantum device and/or to optimize a circuit for execution on a particular system, such as a noisy quantum system.

Still another advantage of the one or more embodiments described herein can be an ability to perform hardware experiments on larger systems and/or on systems with a limited resource budget (e.g., qubit connections, hardware, controllers, and/or the like) as compared to execution of such same quantum circuits absent use of the one or more circuit reduction frameworks presented herein.

Yet another advantage of the one or more embodiments described herein can be improved performance of classical simulators. Indeed, one or more aspects of the frameworks discussed herein, as discussed above, can be employed on a classical computer and/or classical system. Improved performance of such classical system can stem from reduction of circuit complexity, such as including reduction of circuit depth, allowing for reduction in cost of use of such classical system.

The one or more innovations, frameworks, systems, devices, computer program products and/or methods described herein can be additionally, and/or alternatively described as follows:

A system comprises a memory that stores computer executable components, and a processor that executes the computer executable components stored in the memory, wherein the computer executable components comprise a decomposition component that decomposes an exponential of a first Pauli operator of 1 to n Pauli operators of the quantum circuit; and a transformation component that performs a first Clifford transformation of a primary operator of the quantum circuit, wherein the primary operator comprises a linear combination of additional Pauli operators, and wherein the first Clifford transformation employs a result of the decomposition of the exponential of the first Pauli operator.

In accordance with the system, the transformation component further performs additional Clifford transformations of exponentials of other Pauli operators of the 1 to n Pauli operators by employing the result of the decomposition.

In accordance with the system of any previous paragraph of this section, the decomposing by the decomposition component comprises decomposing the exponential of the first Pauli operator into a first non-Clifford operator and a first Clifford operator.

In accordance with the system of any previous paragraph of this section, performing the Clifford transformation by the transformation component comprises using a first Clifford operator resulting from the decomposition of the exponential of the first Pauli operator.

In accordance with the system of any previous paragraph of this section, the system further comprises a permutation component that, prior to the decomposition of the exponential of the first Pauli operator being performed, permutates identity operators of one or more of the 1 to n Pauli operators, of the quantum circuit, towards ends of respective strings of the one or more of the 1 to n Pauli operators.

In accordance with the system of any previous paragraph of this section, the decomposition component performs one or more additional first iterations of decomposition of exponentials of additional ones of the 1 to n Pauli operators, the transformation component performs one or more additional second iterations of Clifford transformations of iterative revisions of the primary operator, and the transformation component performs one or more additional third iterations of Clifford transformations of iterative revisions of exponentials of ones of the additional ones of the 1 to n Pauli operators, for which exponential decomposition has not yet been performed.

In accordance with the system of any previous paragraph of this section, the decomposition component and the transformation component perform the one or more first, second and third additional iterations until all exponentials of the Pauli operators of the 1 to n Pauli operators have been decomposed, one at a time, with corresponding Clifford transformations having been performed.

A computer-implemented method for reducing a quantum circuit comprises performing, by a system operatively coupled to at least one processor, decomposition of an exponential of a first Pauli operator of 1 to n Pauli operators of the quantum circuit, and performing, by the system, a first Clifford transformation of a primary operator of the quantum circuit, wherein the primary operator comprises a linear combination of primary Pauli operators, and wherein the first Clifford transformation employs a result of the decomposition of the exponential of the first Pauli operator.

The computer-implemented method further comprises performing, by the system, additional Clifford transformations of exponentials of other Pauli operators of the 1 to n Pauli operators by employing the result of the decomposition.

In accordance with the computer-implemented method of any previous paragraph of this section, performing the decomposition further comprises decomposing, by the system, the exponential of the first Pauli operator into a first non-Clifford operator and a first Clifford operator.

In accordance with the computer-implemented method of any previous paragraph of this section, performing the first Clifford transformation comprises using, by the system, a first Clifford operator resulting from the decomposition of the exponential of the first Pauli operator.

In accordance with the computer-implemented method of any previous paragraph of this section, the computer-implemented method further comprises, prior to performing the decomposition of the first Pauli operator, permutating, by the system, identity operators of one or more of the 1 to n Pauli operators, of the quantum circuit, towards ends of respective strings of the one or more of the 1 to n Pauli operators.

In accordance with the computer-implemented method of any previous paragraph of this section, the computer-implemented method further comprises, performing, by the system, one or more additional first iterations of decomposition of exponentials of additional ones of the 1 to n Pauli operators, performing, by the system, one or more additional second iterations of Clifford transformations of iterative revisions of the primary operator, and performing, by the system, one or more additional third iterations of Clifford transformations of iterative revisions of exponentials of ones of the additional ones of the 1 to n Pauli operators, for which exponential decomposition has not yet been performed.

In accordance with the computer-implemented method of any previous paragraph of this section, the computer-implemented method further comprises, performing, by the system, the one or more additional first, second and third iterations until all exponentials of the Pauli operators of the 1 to n Pauli operators have been decomposed, one at a time, with corresponding Clifford transformations having been performed.

In accordance with the computer-implemented method of any previous paragraph of this section, the computer-implemented method further comprises, after performing the additional Clifford transformations, executing, by the system, the quantum circuit on a quantum system.

A computer program product facilitating a process to reduce a quantum circuit comprises a non-transitory computer readable storage medium having program instructions embodied therewith, the program instructions executable by a processor to cause the processor to perform, by the processor, decomposition of an exponential of a first Pauli operator of 1 to n Pauli operators of the quantum circuit, and perform, by the processor, a first Clifford transformation of a primary operator of the quantum circuit, wherein the primary operator comprises a linear combination of primary Pauli operators, and wherein the first Clifford transformation employs a result of the decomposition of the exponential of the first Pauli operator.

In accordance with the computer program product of any previous paragraph of this section, the program instructions are further executable by the processor to cause the processor to perform, by the processor, additional Clifford transformations of exponentials of other Pauli operators of the 1 to n Pauli operators by employing the result of the decomposition.

In accordance with the computer program product of any previous paragraph of this section, the performing the Clifford transformation comprises using, by the processor, a first Clifford operator resulting from the decomposition of the exponential of the first Pauli operator.

In accordance with the computer program product of any previous paragraph of this section, the program instructions are further executable by the processor to cause the processor to perform, by the processor, one or more additional first iterations of decomposition of exponentials of additional ones of the 1 to n Pauli operators, perform, by the processor, one or more additional second iterations of Clifford transformations of iterative revisions of the primary operator, and perform, by the processor, one or more additional third iterations of Clifford transformations of iterative revisions of exponentials of ones of the additional ones of the 1 to n Pauli operators, for which exponential decomposition has not yet been performed.

In accordance with the computer program product of any previous paragraph of this section, the program instructions are further executable by the processor to cause the processor to perform, by the processor, the one or more additional first, second and third iterations until all exponentials of the Pauli operators of the 1 to n Pauli operators have been decomposed, one at a time, with corresponding Clifford transformations having been performed.

DESCRIPTION OF THE DRAWINGS

FIG. 7 illustrates circuit identities that can be employed by the quantum circuit reduction system of FIG. 3, in accordance with one or more embodiments described herein.

DETAILED DESCRIPTION

Figure 1:
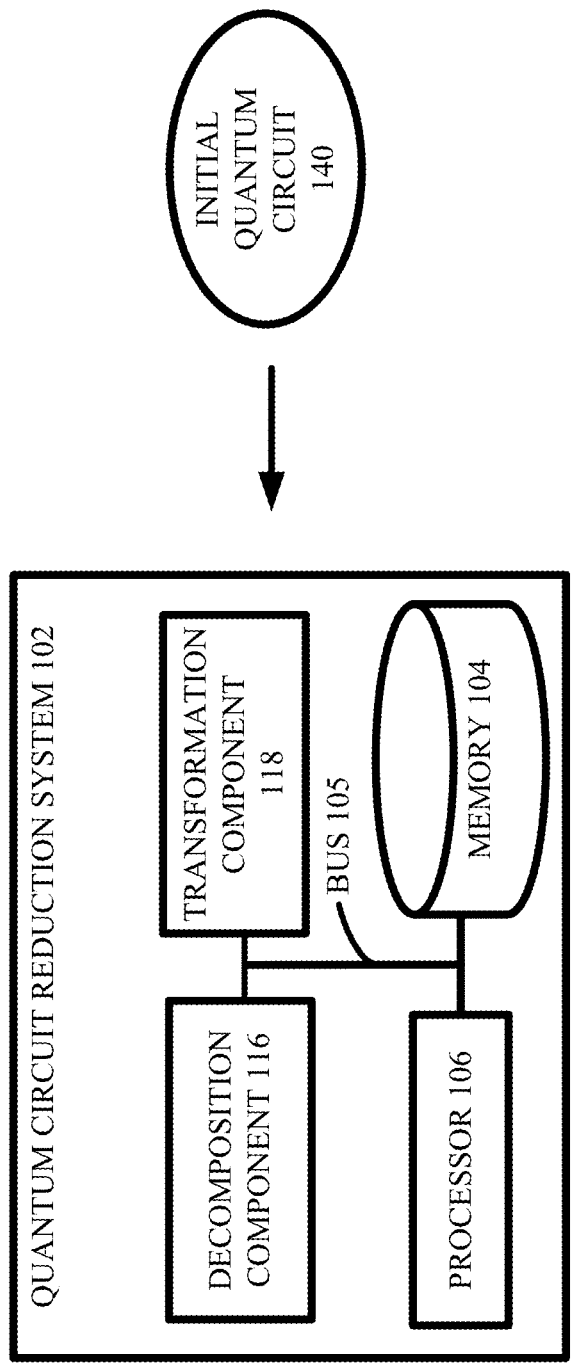
FIG. 1 illustrates a block diagram of an example, non-limiting system that can facilitate quantum circuit reduction, in accordance with one or more embodiments described herein.

The following detailed description is merely illustrative and is not intended to limit embodiments, application and/or uses of embodiments. Furthermore, there is no intention to be bound by any expressed and/or implied information presented in the preceding Background and/or Summary sections, and/or in this Detailed Description section.

Generally, simplification of a quantum circuit can be an aim for execution of such quantum circuit. That is, reduction of a quantum circuit, such as by one or more transformations, can allow for a reduced width and/or depth of the quantum circuit. This reduced width and/or depth can allow for reduced workload for a classical and/or quantum system executing the quantum circuit and/or reduced noise generation during the execution, which can lead to reduced error of resulting measurements and/or reduced cost of execution.

As used herein, a quantum circuit can be a set of operations, such as gates, performed on a classical system and/or on a quantum system.

A quantum system can have a set of real-world physical qubits with the purpose of obtaining one or more qubit measurements.

A quantum processor can comprise the one or more real-world physical qubits.

Qubit states only can exist (or can only be coherent) for a limited amount of time. Thus, an objective of operation of a quantum logic circuit (e.g., including one or more qubits) can be to maximize the utilization of the coherence time of the employed qubits. Time spent to operate the quantum logic circuit can undesirably reduce the available time of operation on one or more qubits. This can be due to the available coherence time of the one or more qubits prior to decoherence of the one or more qubits. For example, a qubit state can be lost in less than 100 to 200 microseconds in one or more cases.

Operation of the quantum circuit on a quantum system can be supported, such as by a pulse component (also herein referred to as a waveform generator), to produce one or more physical pulses and/or other waveforms, signals and/or frequencies to alter one or more states of one or more of the physical qubits. The altered states can be measured, thus allowing for one or more computations to be performed regarding the qubits and/or the respective altered states.

Operations on qubits generally can introduce some error, such as some level of decoherence and/or some level of quantum noise, further affecting qubit availability. Quantum noise can refer to noise attributable to the discrete and/or probabilistic natures of quantum interactions.

Likewise, with a classical computer, operation of quantum gates can generally be exponentially costly in the number of quantum operations to implement. Simplified quantum circuits can be executed using classical computers with reduced cost compared to original circuits, and hence can improve and/or bypass approximation error.

As used herein, the term "circuit depth" can refer to longest path in the quantum circuit, which can comprise a plurality of paths. For a path, path length can be represented by an integer number representing a number of gates to be executed in that path.

As used herein, the term "cost" can refer to money, power, memory, bandwidth, time, manpower and/or the like.

As used herein, the terms "entity", "requesting entity", and "user entity" can refer to a machine, device, component, hardware, software, smart device and/or human.

Execution of quantum circuits often can be limited or at least hindered by quantum circuit complexity, such as number of quantum gates, order of quantum gates, type of quantum gates, quantities of particular quantum gates such as controlled NOT gates (CNOT gates), and/or the like. In addition, existing techniques for quantum circuit reduction can require often-unavailable processing power, time, bandwidth and/or memory, and thus can result in reduction of use or non-usage of certain types of quantum circuit, quantum gates, circuit identities and/or the like.

To address one or more of the aforementioned deficiencies, one or more frameworks discussed herein can be employed to reduce a quantum circuit, such as automatically, by a classical system and/or by a quantum system.

Generally, embodiments of devices, systems, computer-implemented methods and/or computer program products to be discussed herein can reduce the width and/or depth of a quantum circuit, to thereby lead to reduced noise upon execution of the quantum circuit and reduced error in measurement resulting from the execution. This reduction can result for expectation values of a primary operator with respect to a wavefunction comprised of Pauli operators and Clifford gates, without being limited thereto. Such a reduction can enable improved performance of quantum algorithms on near term quantum systems limited by coherence times or unacceptable error rates of circuits with high circuit depth, thus improving the operation of such circuits.

The frameworks discussed herein can be employed for various quantum problems, such as comprising common quantum algorithms, such as variational quantum eigensolvers (VQEs), quantum approximate optimization algorithms (QAOAs), Trotter Formulae, circuit transpilation, and/or the like.

As used herein, transpilation can refer to a process of rewriting an input quantum circuit to match a topology of a quantum device and/or to optimize a circuit for execution on a particular system, such as a noisy quantum system.

The various quantum algorithms on which the framework can be employed can be related to various technical fields, such as, but not limited to, chemistry, physics, biology and/or the like.

Regarding the one or more frameworks discussed herein, generally, in one or more cases, an optional permutation of existing quantum circuit identities, also herein referred to as circuit identities, of the operators of the quantum circuit can be first performed. The framework can further employ one or more additional circuit identities to transform one or more of the parts of the operators quantum circuit into revised or modified quantum circuits operators. Based on a transformation of the one or more operators given by quantum circuits, such as on a decomposition of one or more exponentials of Pauli operators, Clifford operators given by quantum circuits can be formed.

A Clifford operator given by a quantum circuit from the decomposition of one operator, such as from decomposition of an exponential of a Pauli operator, can be employed in a Clifford transformation of exponentials of other Pauli operators of the quantum circuit. That is, other Pauli operators having exponentials not yet decomposed to obtain respective Clifford operators can be likewise decomposed. One exponential of a Pauli operator at a time can be decomposed, such as working left to right along a quantum circuit.

Also using the obtained Clifford operator, a primary operator, such as a Hamiltonian or measurement operator, for which the expectation value is desired, also can be transformed via a corresponding Clifford transformation.

As a result of one iteration, a set of revised Pauli operators, having had their respective exponentials revised, and a revised primary operator, can result, constituting a reduced quantum circuit.

To further reduce the quantum circuit, one or more additional iterations of decomposition and Clifford transformation can be performed. That is, a next operator corresponding to the exponential of the next Pauli operator in the quantum circuit, such as working left to right, can be decomposed to obtain a combination of a non-Clifford operator and a corresponding Clifford operator. The Clifford operator obtained can be employed in respective Clifford transformations of exponentials of other Pauli operators in the quantum circuit (e.g., those further to the right in a left-to-right direct) and of the revised primary operator. It is noted that the other Pauli operators will be those having not yet had their respective exponentials decomposed.

As a result of the additional iterations, a set of revised operators and a revised primary operator can result, constituting a reduced quantum circuit. A fully reduced quantum circuit, according to the one or more frameworks described herein, can be obtained upon decomposition, one by one, of the exponential of each Pauli operator of the quantum circuit, along with corresponding executions of the corresponding Clifford transformations.

It is noted that the via the transformations (e.g., due to first and additional iterations) of the primary operator, a number of terms of the primary operator is not adjusted, and thus additional terms, such as Pauli strings, are not generated.

It also is noted that the one or more frameworks described herein can be employed relative to quantum systems having various spectrums of qubit-to-qubit connectivity, e.g., ranging from single connectivity to all-to-all connectivity.

The resulting reduced quantum circuit can have reduced width and/or depth, and/or a reduced number of CNOT gates to be performed to execute the reduced quantum circuit, as compared to the initial quantum circuit. One or more of these aspects are what can result in reduced system noise and/or reduced estimation error produced by execution of the reduced quantum circuit.

In the case of a classical system, less complex execution can result, and indeed, the one or more steps described above can be performed on a classical system. Further, in the case of a quantum system, less qubit coherency time can be employed, of qubits on which the quantum circuit can be operated, which can allow for increased use of the coherent time of the qubits (e.g., efficient qubit coherency usage).

As used herein, "less complex" can refer to fewer classical resources being needed, such as in terms of computing power and/or time. In a general scenario, barring few classes of quantum circuits like the Clifford circuits, the needed classical resources to simulate a given quantum circuit can scale exponentially in quantum operations described in a quantum circuit. In such situations, algorithms that can approximate the simulation of the quantum circuit using the classical computer can be used, which can induce approximation errors, also herein referred to as estimation errors. With a simplified representation of the original quantum circuit, the total number of quantum operations can reduce and hence the computing power and/or time for simulating the quantum circuit on a classical computer can reduce. This can lead to reduction in cost of the computation and reduce the approximation errors.

As used herein, a Clifford operator can refer to an operator that can be executed using only Clifford gates, such as I, X, Y, Z, S, St, CZ, CNOT and/or Swap Gate.

As used herein, a Clifford transformation can refer to a transformation of an operator (such as a Pauli operator) by employing a Clifford operator.

As used herein, a multi-qubit Pauli operator, also herein referred to a Pauli string, can refer to an operator having one or more single-qubit Pauli operators such as I, X, Y and/or Z.

As used here, an exponential of a Pauli operator can be an operator that refers to an operator constructed by exponenting a Pauli operator.

One or more embodiments are now described with reference to the drawings, where like referenced numerals are used to refer to like elements throughout. In the following description, for purposes of explanation, numerous specific details are set forth in order to provide a more thorough understanding of the one or more embodiments. It is evident in various cases, however, that the one or more embodiments can be practiced without these specific details.

Further, it should be appreciated that the embodiments depicted in one or more figures described herein are for illustration only, and as such, the architecture of embodiments is not limited to the systems, devices and/or components depicted therein, nor to any particular order, connection and/or coupling of systems, devices and/or components depicted therein. For example, in one or more embodiments, the non-limiting systems 100, 200 and/or 300 illustrated at FIGS. 1, 2 and/or 3, and/or systems thereof, can further comprise one or more computer and/or computing-based elements described herein with reference to an operating environment, such as the operating environment 1600 illustrated at FIG. 16. In one or more described embodiments, computer and/or computing-based elements can be used in connection with implementing one or more of the systems, devices, components and/or computer-implemented operations shown and/or described in connection with FIGS. 1, 2 and/or 3 and/or with other figures described herein.

Turning now in particular to one or more figures, and first to FIG. 1, the figure illustrates a block diagram of an example, non-limiting system 100 that can facilitate quantum circuit reduction, of one or more quantum circuits at least partially in parallel with one another, in accordance with one or more embodiments described herein.

The non-limiting system 100 can comprise a quantum circuit reduction system 102, which can be associated with a cloud computing environment. The quantum circuit reduction system 102 can comprise one or more components, such as a memory 104, processor 106, bus 105, decomposition component 116 and/or transformation component 118. Generally, quantum circuit reduction system 102, and thus non-limiting system 100, can facilitate reduction, such as automatic reduction, of a quantum circuit, such as initial quantum circuit 140 into a reduced quantum circuit. The quantum circuit 140 can comprise a primary operator (e.g., Hamiltonian operator and/or measurement operator) and one or more Pauli operators, for example. The quantum circuit can result from use of a quantum algorithm, such as a VQE or QAOA.

The decomposition component 116 can decompose the exponential of a first Pauli operator of 1 to n Pauli operators of the quantum circuit 140. The transformation component 118 can perform a first Clifford transformation of the primary operator of the quantum circuit 140, where the first Clifford transformation can employ a result of the decomposition of the exponential of the first Pauli operator. In one or more embodiments, the transformation component 118 further can perform additional Clifford transformations of exponentials of other Pauli operators of the 1 to n Pauli operators by employing the same result of the decomposition of the exponential of the first Pauli operator.

Figure 2:
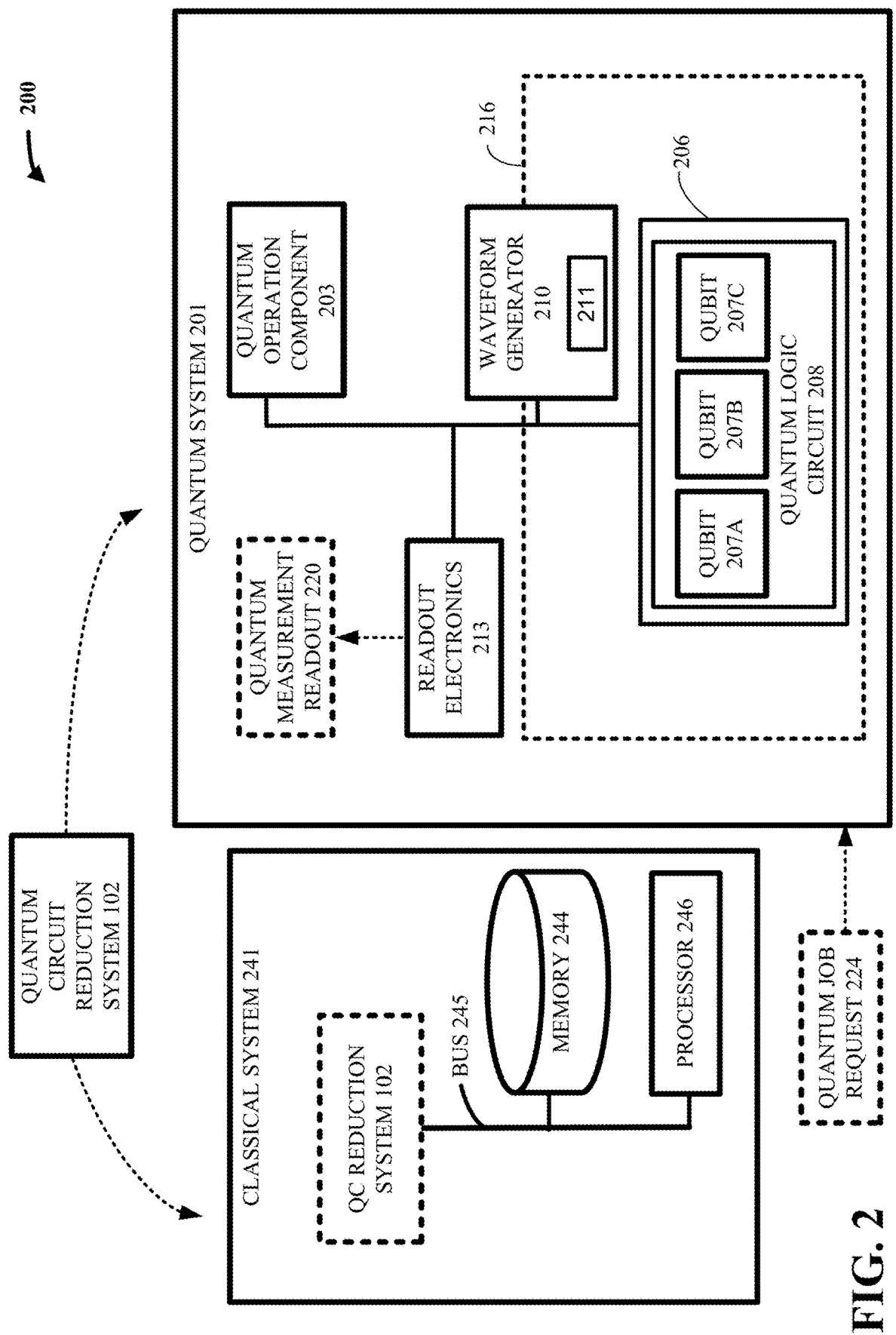
FIG. 2 illustrates a diagram of another example, non-limiting system that can facilitate quantum circuit reduction, in accordance with one or more embodiments described herein.

Turning next to FIG. 2, a non-limiting system 200 is illustrated that can comprise the quantum circuit reduction system 100 of FIG. 1. Repetitive description of like elements and/or processes employed in respective embodiments is omitted for sake of brevity. Description relative to an embodiment of FIG. 1 can be applicable to an embodiment of FIG. 2. Likewise, description relative to an embodiment of FIG. 2 can be applicable to an embodiment of FIG. 1.

As illustrated, the non-limiting system 200 can comprise a classical system 241 that can be employed with or without a quantum system, such as the quantum system 201. The classical system 241, can comprise components, such as a memory 244, processor 246 and/or bus 245. The quantum circuit reduction system 102 can be at least partially comprised by and/or be external to the classical system 241. In one or more embodiments, the memory 244 and/or processor 246 can be omitted, and instead the memory 104 and/or processor 106 can be employed. In one or more embodiments, the quantum circuit reduction system 102 can employ the memory 244 and/or processor 246 and the memory 104 and/or processor 106 can be omitted.

In one or more embodiments, the quantum reduction system 102 can be comprised be at least partially comprised by and/or be external to the quantum system 201.

In one or more embodiments, the non-limiting system 200 can be a hybrid system and thus can include both a quantum system and a classical system, such as the quantum system 201 and the classical-based system 241 (also herein referred to as a classical system 241). In one or more embodiments, one or more components of the quantum system 201, such as the readout electronics 213, can be at least partially comprised by the classical system 241, or otherwise comprised external to the quantum system 201. In one or more embodiments, one or more components of the classical system 241 can be at least partially comprised by the quantum system 201, or otherwise comprised external to the classical system 241.

One or more communications between one or more components of the non-limiting system 200 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The classical system 202 and/or the quantum system 201 can be associated with, such as accessible via, a cloud computing environment 1750 described below with reference to FIG. 17 and/or with one or more functional abstraction layers described below with reference to FIG. 18 (e.g., hardware and software layer 1860, virtualization layer 1870, management layer 1880 and/or workloads layer 1890). For example, the classical system 241 can be associated with a cloud computing environment 1750 such that aspects of classical processing can be distributed between the classical system 241 and the cloud computing environment 1750.

Turning now to the quantum system 201, generally based on a quantum job request 224, such as comprising a quantum circuit to be executed (e.g., resulting from use of the quantum circuit reduction system 102), the quantum operation component 203 and/or quantum processor 206 can direct execution of the quantum circuit at the quantum logic circuit 208.

Generally, the quantum system 201 (e.g., quantum computer system, superconducting quantum computer system and/or the like) can employ quantum algorithms and/or quantum circuitry, including computing components and/or devices, to perform quantum operations and/or functions on input data to produce results that can be output to an entity.

The quantum circuitry can comprise quantum bits (qubits), such as multi-bit qubits, physical circuit level components, high level components and/or functions. The quantum circuitry can comprise physical pulses that can be structured (e.g., arranged and/or designed) to perform desired quantum functions and/or computations on data (e.g., input data and/or intermediate data derived from input data) to produce one or more quantum results as an output. The quantum results, e.g., quantum measurement readout 220, can be responsive to the quantum job request 224 and associated input data and can be based at least in part on the input data, quantum functions and/or quantum computations.

In one or more embodiments, the quantum system 201 can comprise components, such as a quantum operation component 203, a quantum processor 206, pulse component 210 (e.g., a waveform generator) and/or the readout electronics 213. In one or more other embodiments, the readout electronics 213 can be comprised at least partially by the classical system 241 and/or be external to the quantum system 201. The quantum processor 206 can comprise the quantum logic circuit 208 comprising one or more, such as plural, qubits 207. Individual qubits 207A, 207B and 207C, for example, can be fixed frequency and/or single junction qubits, such as transmon qubits.

The quantum processor 206 can be any suitable processor. The quantum processor 206 can generate one or more instructions for controlling the one or more processes of the quantum operation component 203 and/or for controlling the quantum logic circuit 208.

The quantum operation component 203 can obtain (e.g., download, receive, search for and/or the like) a quantum job request 224 requesting execution of one or more quantum programs and/or a physical qubit layout. The quantum job request 224 can be provided in any suitable format, such as a text format, binary format and/or another suitable format. In one or more embodiments, the quantum job request 224 can be received by a component other than of the quantum system 201, such as a by a component of the classical system 241 or the quantum circuit reduction system 102.

The quantum operation component 203 can determine one or more quantum logic circuits, such resulting from use of the quantum circuit reduction system 201, for executing a quantum program. In one or more embodiments, the quantum operation component 203 and/or quantum processor 206 can direct the waveform generator 210 to generate one or more pulses 211, tones, waveforms and/or the like to affect one or more qubits 207.

The waveform generator 210 can generally perform one or more quantum processes, calculations and/or measurements for shifting the frequency of one or more qubits 207, such as when in respective excited states. For example, the waveform generator 210 can operate one or more qubit effectors, such as qubit oscillators, harmonic oscillators, pulse generators and/or the like to cause one or more pulses to stimulate and/or manipulate the state(s) of the one or more qubits 207 comprised by the quantum system 201.

The quantum logic circuit 208 and a portion or all of the waveform generator 210 can be contained in a cryogenic environment, such as generated by a cryogenic chamber 217, such as a dilution refrigerator. Indeed, a signal can be generated by the waveform generator 210 to affect one or more of the plurality of qubits 207. Where the plurality of qubits 207 are superconducting qubits, cryogenic temperatures, such as about 4 Kelvin (K) or lower can be employed for function of these physical qubits. Accordingly, one or more elements of the readout electronics 213 also can be constructed to perform at such cryogenic temperatures.

The readout electronics 213, or at least a portion thereof, can be contained in the cryogenic chamber 217, such as for reading a state, frequency and/or other characteristic of qubit, excited, decaying or otherwise.

Turning now to further description of the classical system 241, generally, the classical system 241 can comprise any suitable type of component, machine, device, facility, apparatus and/or instrument that comprises a processor and/or can be capable of effective and/or operative communication with a wired and/or wireless network. All such embodiments are envisioned. For example, the classical 241 can comprise a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device. Likewise, the classical system 241 can be disposed and/or run at any suitable device, such as, but not limited to a server device, computing device, general-purpose computer, special-purpose computer, quantum computing device (e.g., a quantum computer), tablet computing device, handheld device, server class computing machine and/or database, laptop computer, notebook computer, desktop computer, cell phone, smart phone, consumer appliance and/or instrumentation, industrial and/or commercial device, digital assistant, multimedia Internet enabled phone, multimedia players and/or another type of device and/or computing device.

In one or more embodiments, the classical system 241 can comprise the processor 246 (e.g., computer processing unit, microprocessor, classical processor, quantum processor and/or like processor). In one or more embodiments, a component associated with qubit reset system 241, as described herein with or without reference to the one or more figures of the one or more embodiments, can comprise one or more computer and/or machine readable, writable and/or executable components and/or instructions that can be executed by processor 246 to provide performance of one or more processes defined by such component(s) and/or instruction (s).

In one or more embodiments, the computer-readable memory 244 can be operably connected to the processor 246. The memory 244 can store computer-executable instructions that, upon execution by the processor 246, can cause the processor 246 to perform one or more actions.

Figure 3:
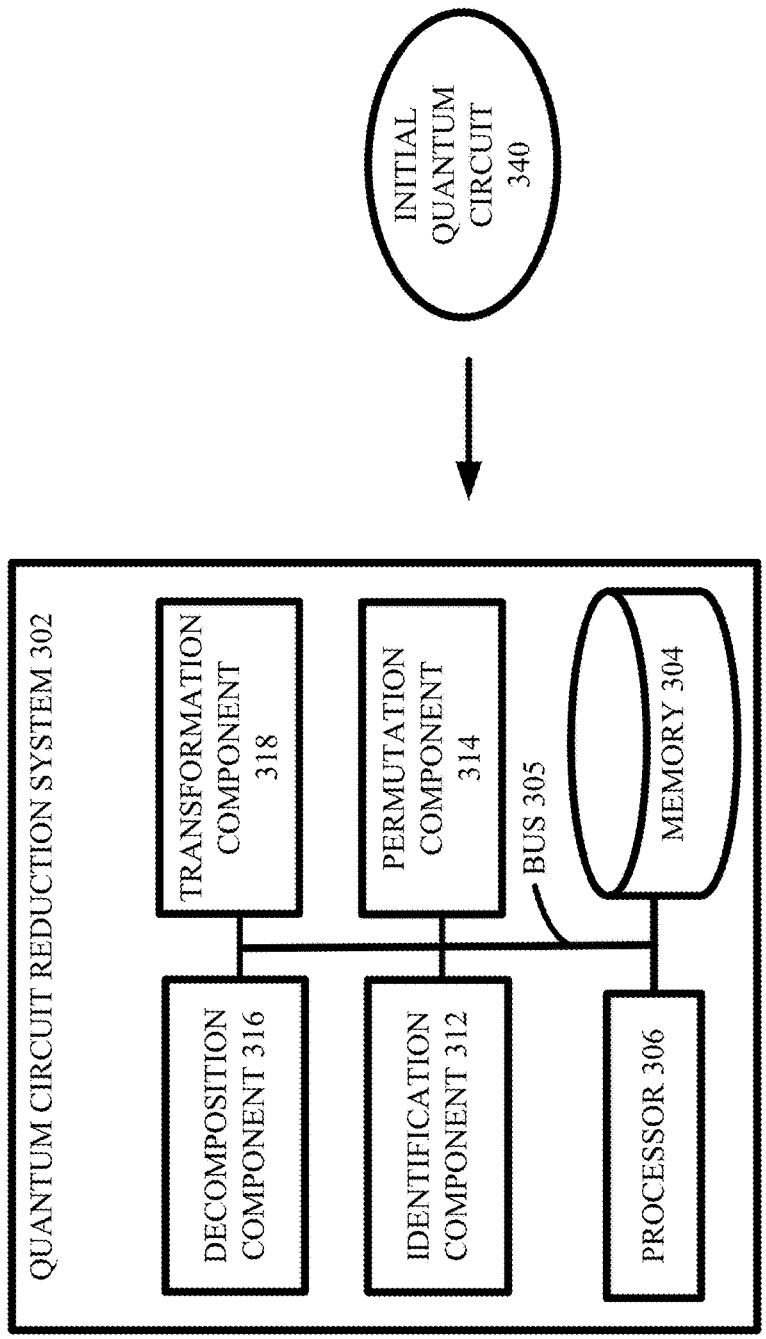
FIG. 3 illustrates a diagram of another example, non-limiting system that can facilitate quantum circuit reduction, in accordance with one or more embodiments described herein.

Turning now to FIG. 3, illustrated is a non-limiting system 300 comprising another embodiment of a quantum circuit reduction system 302. Repetitive description of like elements and/or processes employed in respective embodiments is omitted for sake of brevity. As indicated previously, description relative to an embodiment of FIG. 1 or 2 can be applicable to an embodiment of FIG. 3. Likewise, description relative to an embodiment of FIG. 3 can be applicable to an embodiment of FIG. 1 or 2.

One or more communications between one or more components of the non-limiting system 300 can be provided by wired and/or wireless means including, but not limited to, employing a cellular network, a wide area network (WAN) (e.g., the Internet), and/or a local area network (LAN). Suitable wired or wireless technologies for supporting the communications can include, without being limited to, wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (Ipv6 over Low power Wireless Area Networks), Z-Wave, an advanced and/or adaptive network technology (ANT), an ultra-wideband (UWB) standard protocol and/or other proprietary and/or non-proprietary communication protocols.

The quantum circuit reduction system 302 can be associated with, such as accessible via, a cloud computing environment 1750 described below with reference to FIG. 17 and/or with one or more functional abstraction layers described below with reference to FIG. 18 (e.g., hardware and software layer 1860, virtualization layer 1870, management layer 1880 and/or workloads layer 1890).

The quantum circuit reduction system 302 can comprise a plurality of components. The components can include a memory 304, processor 306, bus 305, identification component 312, permutation component 314, decomposition component 316 and/or transformation component 318.

Generally, the quantum circuit reduction system 302 can obtain a quantum circuit (e.g., initial quantum circuit 340) and provide a resultant reduced quantum circuit via execution of one or more processes and/or operations of the quantum circuit reduction system 302.

Discussion first turns briefly to the processor 306, memory 304 and bus 305 of the quantum circuit reduction system 302. For example, in one or more embodiments, the quantum circuit reduction system 302 can comprise the processor 306 (e.g., computer processing unit, microprocessor, classical processor, quantum processor and/or like processor). In one or more embodiments, a component associated with quantum circuit reduction system 302, as described herein with or without reference to the one or more figures of the one or more embodiments, can comprise one or more computer and/or machine readable, writable and/or executable components and/or instructions that can be executed by processor 306 to provide performance of one or more processes defined by such component(s) and/or instruction(s). In one or more embodiments, the processor 306 can comprise the identification component 312, permutation component 314, decomposition component 316 and/or transformation component 318.

In one or more embodiments, the quantum circuit reduction system 302 can comprise the computer-readable memory 304 that can be operably connected to the processor 306. The memory 304 can store computer-executable instructions that, upon execution by the processor 306, can cause the processor 306 and/or one or more other components of the quantum circuit reduction system 302 (e.g., identification component 312, permutation component 314, decomposition component 316 and/or transformation component 318) to perform one or more actions. In one or more embodiments, the memory 304 can store computer-executable components (e.g., identification component 312, permutation component 314, decomposition component 316 and/or transformation component 318). The quantum circuit reduction system 302 and/or a component thereof as described herein, can be communicatively, electrically, operatively, optically and/or otherwise coupled to one another via a bus 305. Bus 305 can comprise one or more of a memory bus, memory controller, peripheral bus, external bus, local bus, quantum bus and/or another type of bus that can employ one or more bus architectures. One or more of these examples of bus 305 can be employed.

In one or more embodiments, the quantum circuit reduction system 302 can be coupled (e.g., communicatively, electrically, operatively, optically and/or like function) to one or more external systems (e.g., a non-illustrated electrical output production system, one or more output targets, an output target controller and/or the like), sources and/or devices (e.g., classical and/or quantum computing devices, communication devices and/or like devices), such as via a network. In one or more embodiments, one or more of the components of the quantum circuit reduction system 302 and/or of the non-limiting system 300 can reside in the cloud, and/or can reside locally in a local computing environment (e.g., at a specified location(s)).

In addition to the processor 306 and/or memory 304 described above, the quantum circuit reduction system 302 can comprise one or more computer and/or machine readable, writable and/or executable components and/or instructions that, when executed by processor 306, can provide performance of one or more operations defined by such component(s) and/or instruction(s).

Turning now to the additional components of the quantum circuit reduction system 302 (e.g., identification component 312, permutation component 314, decomposition component 316 and/or transformation component 318), generally, the quantum circuit reduction system 302 can perform a set of iterative operations on operators of the quantum circuit to provide revised operators comprising reduced depth and/or width.

Turning first to the identification component 312, this component can identify, search, receive, transfer and/or otherwise obtain the initial quantum circuit 340 to be reduced. As indicated above, the initial quantum circuit 340 can be generated relative to one or more quantum algorithms related to one or more various technical fields.

In one or more embodiments, the identification component 312 can identify one or more circuit identities to be employed by the decomposition component 316 and/or transformation component 318. The circuit identities can be identified at a location internal to and/or external to the quantum circuit reduction system 302. For example, one or more knowledge bases can be communicatively coupled to the quantum circuit reduction system 302 and can comprise one or more circuit identities.

Figure 4:
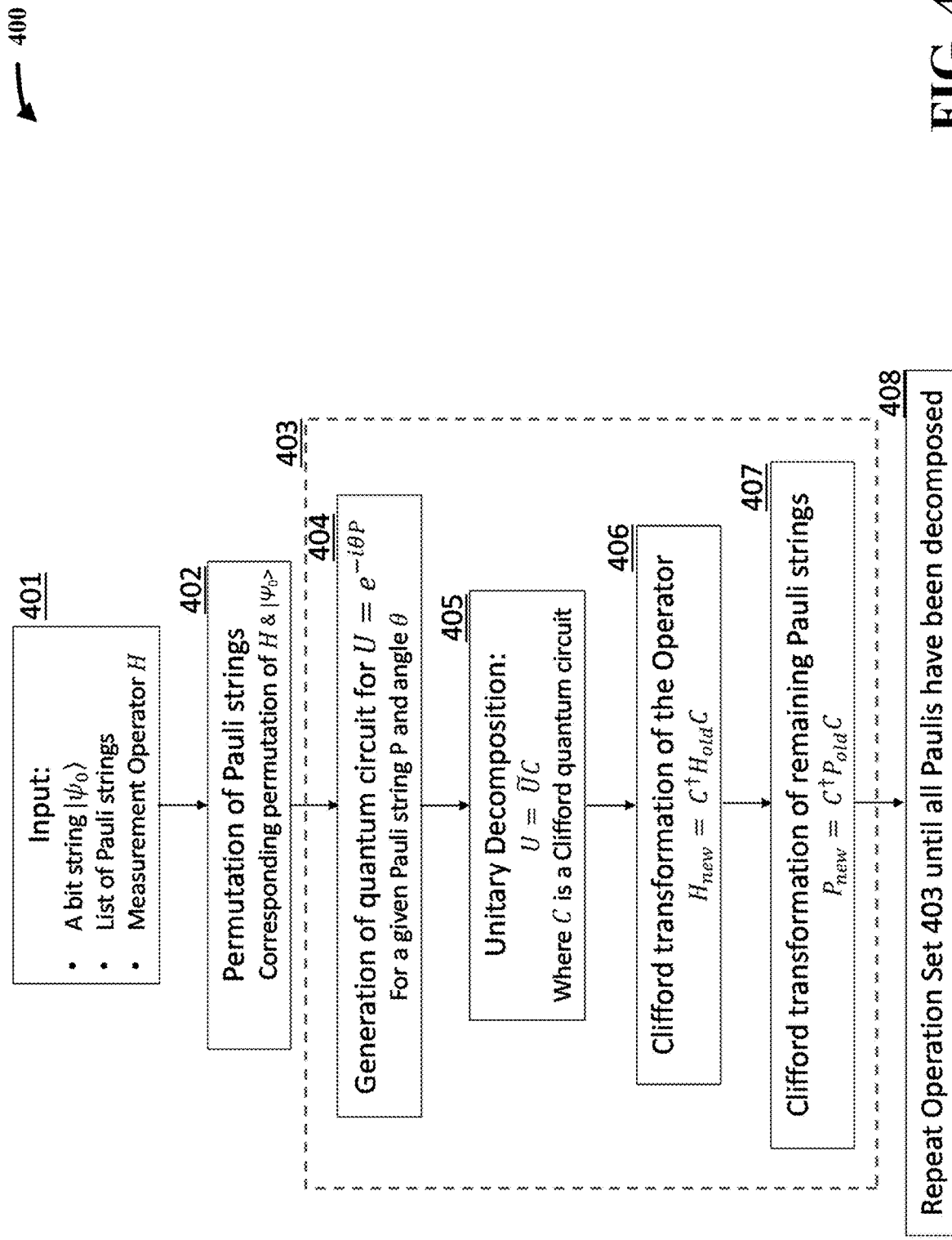
FIG. 4 illustrates a schematic diagram of example operations that can be performed by the quantum circuit reduction system of FIG. 3, in accordance with one or more embodiments described herein.

Turning now to FIG. 4, in addition still to FIG. 3, a schematic 400 is illustrated comprising a set of operations that can be performed by the permutation component 314, decomposition component 316 and/or transformation component 318 of the quantum circuit reduction system 302. As illustrated, the set of operations can comprise permutation of Pauli operators (also herein referred to as Pauli strings and/or simply Paulis) at operation 402. An iterative set 403 of operations 404, 405, 406 and 407 can be performed on the Pauli operators (e.g., on the exponentials of the Pauli operators) of the quantum circuit and on a primary operator of the quantum circuit. These operations can comprise creation of the operator representing the exponential of the Pauli operator at operation 404, operator decomposition of the exponential of the Pauli operator at operation 405, Clifford transformation of the primary operator (e.g., Hamiltonian operator and/or measurement operator) at operation 406, and Clifford transformation of other Paulis and exponentials thereof of the quantum circuit at operation 407. Indeed, as indicated above and at operation 408, operation set 403 can be repeated until operators corresponding to all Paulis have been decomposed, one at a time, with the result of each respective operator decomposition being employed for the Clifford transformations of the corresponding operations 406 and 407.

Description now turns to details of the various operations illustrated at FIG. 4. These operations will be described relative to the various FIGS. 5 to 11.

The inputs 401 can comprise a set of Pauli operators of the quantum circuit 340 (e.g., Pauli strings), the operator H (e.g., primary operator such as a Hamiltonian operator) which can represent the operator to be measured (e.g., the expectation value of which is being sought), and an input bitstring on which the operators corresponding to the exponentials of Paulis can be applied. The input bitstring can, for example, be represented by:

Equation 1: $|\psi_0\rangle = |b_1 b_2 \ldots b_m\rangle$, $b \in \{0,1\}$, where the bits b are a series of zeroes and ones, and where psi can be a representation of the respective wave function.

Figure 5:
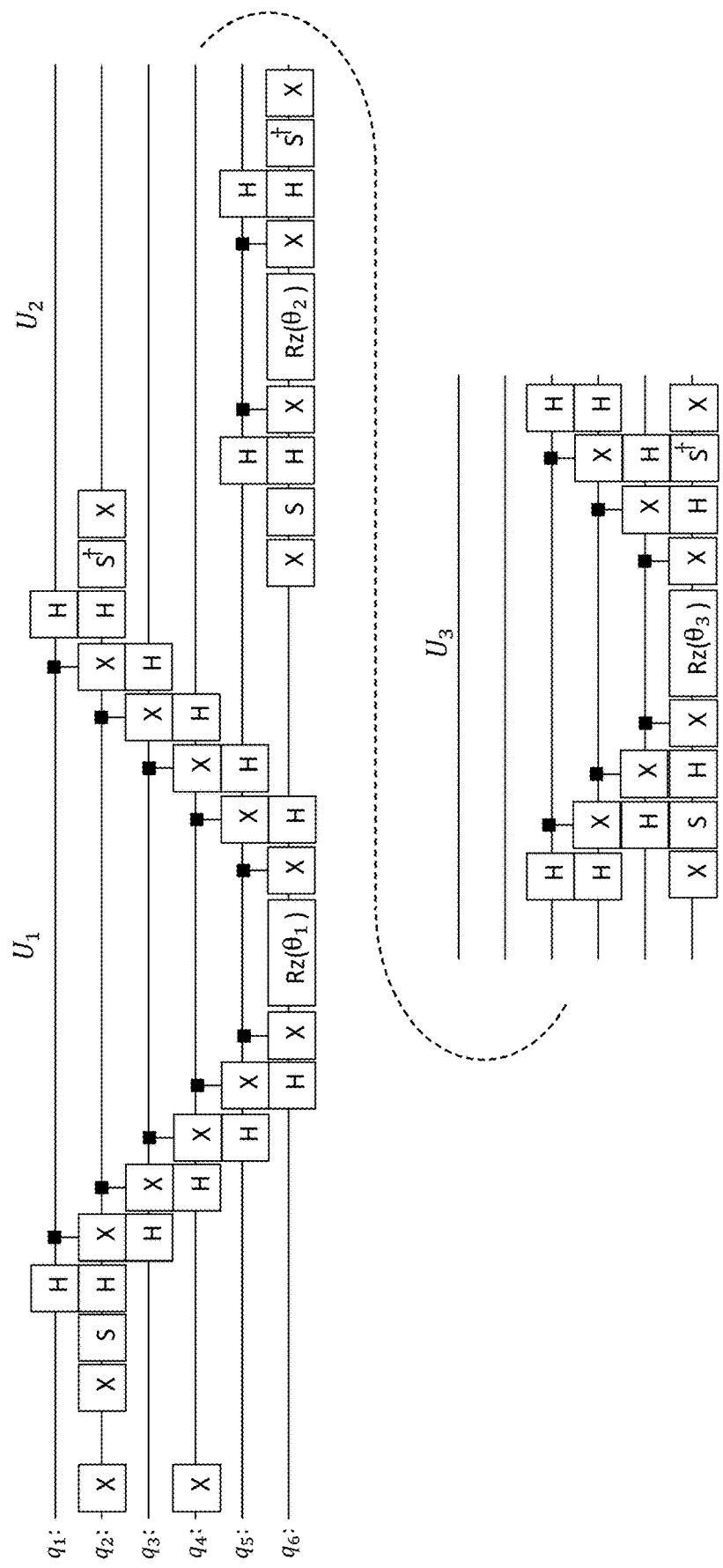
FIG. 5 illustrates an example quantum circuit that can be operated upon by the quantum circuit reduction system of FIG. 3, in accordance with one or more embodiments described herein.

Starting at FIG. 5, the initial quantum circuit 340 as an example of initial quantum circuit is illustrated in detail. From left to right, the quantum circuit 340 comprises a first exponential of Pauli operator $U_1$, a second exponential of Pauli operator $U_2$, and a third exponential of Pauli operator $U_3$. (It is noted that FIG. 5 illustrates the quantum circuit after permutation, which will be described below. This is of no consequence to the description of FIG. 5, as permutation leaves expectation values unchanged.) The quantum circuit reduction system 302 is configured to act on one Pauli operator at a time, such as from left to right, until each Pauli operator is acted upon, thus allowing for full reduction of the quantum circuit 340 by the quantum circuit reduction system 302.

In general, an actual exemplary circuit of the wavefunction can have the form:

Equation 2: $|\psi\rangle = e^{i\theta_n P_n} \ldots e^{i\theta_k P_k} \ldots e^{i\theta_2 P_2} e^{i\theta_1 P_1} |\psi_0\rangle$, where $\theta_k \in \mathbb{R}$, $P_k \in \{I, X, Y, Z\}^{\otimes m}$, $|\psi_0\rangle = |b_1 b_2 \ldots b_m\rangle$, $b \in \{0,1\}$, n is the number of Pauli strings, m is the number of qubits, $\theta_k$ is the angle of rotation for a particular Pauli $P_k$, and psi can be a representation of the respective wave function.

As used herein, an exponential of a Pauli operator is an operator comprising of an exponential of a Pauli operator (e.g., $P_k$). As used herein a Pauli operator is a quantum operator comprising a combination of Pauli matrices or Pauli operators I, X, Y and Z, with each operator being an m-qubit operator relative to Equation 2. More particularly, m can represent the dimensions of the corresponding Hilbert space of $2^m$.

Such quantum circuit along with qubit measurements can be used in the general calculation of an equation having the form:

Equation 3: $\langle \psi | H | \psi \rangle$, where $H = \Sigma_i \alpha_i Q_i$, where $\alpha_k \in \mathbb{R}$, $Q_k \in \{I, X, Y, Z\}^{\otimes m}$, where Q is a set of m-qubit Pauli operators, and where alpha represents coefficients that form part of the linear combination of Pauli operators of Equation 3.

That is, Equation 2 can be employed for Ansatz reduction, in an embodiment, where expectation values are to be measured. Two aspects can be involved. The first is the state also called the wavefunction with which we want to measure the expectation value, represented by Equation 2. The second is the operator, as illustrated in Equation 3, which is a linear combination of Pauli operators.

Turning again to the exemplary quantum circuit 340 illustrated in detail at FIG. 5, as shown, one or more of the operators constructed by exponentiating Pauli operators can comprise one or more ladders of CNOT gates in its quantum circuit representation. That is implementation of the quantum circuit 340 can lead to these gates, which are two qubit gates, and which can cause system noise via their execution. Accordingly, reduction of and elimination of CNOT gates is desirable.

Regarding the exemplary quantum circuit 340, operator operators (U) representing exponentials of Pauli operator (P), $U=e^{(-i\theta P)}$ can be constructed using Clifford gates I, X, Y, Z, H, S, S† and CNOT gates and non-Clifford $Rz(\theta)$ gate. The operator U has 4 parts including a layer of single qubit Clifford gates, followed by a ladder of CNOT gates connecting qubits acted upon by non-identity single qubit Pauli operator in Pauli operator P, then a Rz rotation with an angle of θ on the last qubit acted by a non-identity Pauli operator, followed by complex conjugate of the CNOT ladder and the single qubit Clifford gates. The single qubit Clifford gates can be selected as follows: if the single qubit Pauli operator in the Pauli operator P is Z, then apply I gate to that qubit; if it is X, then apply H gate to that qubit; if it is Y, then apply XSH gates to that qubit; and if it is I, then leave that qubit unacted upon by any quantum gates.

To reduce the exemplary quantum circuit 340, as a first, and optional step, permutation, such as global permutation of operators of the quantum circuit, such as Pauli operators, primary operator and initial bitstring wavefunction can be performed by the permutation component 314. This step can be performed once and can allow for permutation of single qubit Pauli operators of one or more of the 1 to n Pauli operators. Here for example, for three Pauli operators with n being 3, permutation can involve collecting identity Pauli operator towards ends of the respective Pauli operators (e.g., towards ends of the respective strings of the respective Pauli operators).

For example, an initial, non-permutated set of Paulis can comprise: $P_1$=YXXXXX, $P_2$=IYIIXI, and $P_3$=IYIXXX. In one embodiment, the permutation component 314 can permute the qubits of the Pauli strings accumulating identity operators towards one end, such as with highest weight for the first Pauli string, and so forth. A result of permuted Pauli strings of the example can thus be $P_1$=XYXXXX, $P_2$=IIIIXY, and $P_3$=IIXXXY.

For further example, relative to Equation 3, permutation can result in $\langle \psi|H|\psi \rangle = \langle \psi_{perm}|H_{perm}|\omega_{perm} \rangle$, with permutation leaving expectation values unchanged. Indeed, as indicated above, the FIG. 5 depiction of the quantum circuit 340 is one where full circuit permutation was performed for each of the Pauli strings corresponding to operators $U_1$, $U_2$, and $U_3$ as well as for the primary operator H and initial bitstring $|\psi_0\rangle$. For example, a permutation rule obtained for the Pauli operators can be employed for the permutation of the H operator to leave the expectation value invariant.

Description next turns to a first iteration of operations 404 to 406, relative to the first operator, $U_1$, obtained by exponentiating first Pauli operator. The first operator $U_1$ can be decomposed by the decomposition component 316. In an example, the first Pauli operator can be represented by $U_1 = e^{i2\theta_1 P_1}$, where decomposition results in $U_1 = U_1^{(1)}C^1$, where $C^1$ is a first Clifford operator.

Figure 6:
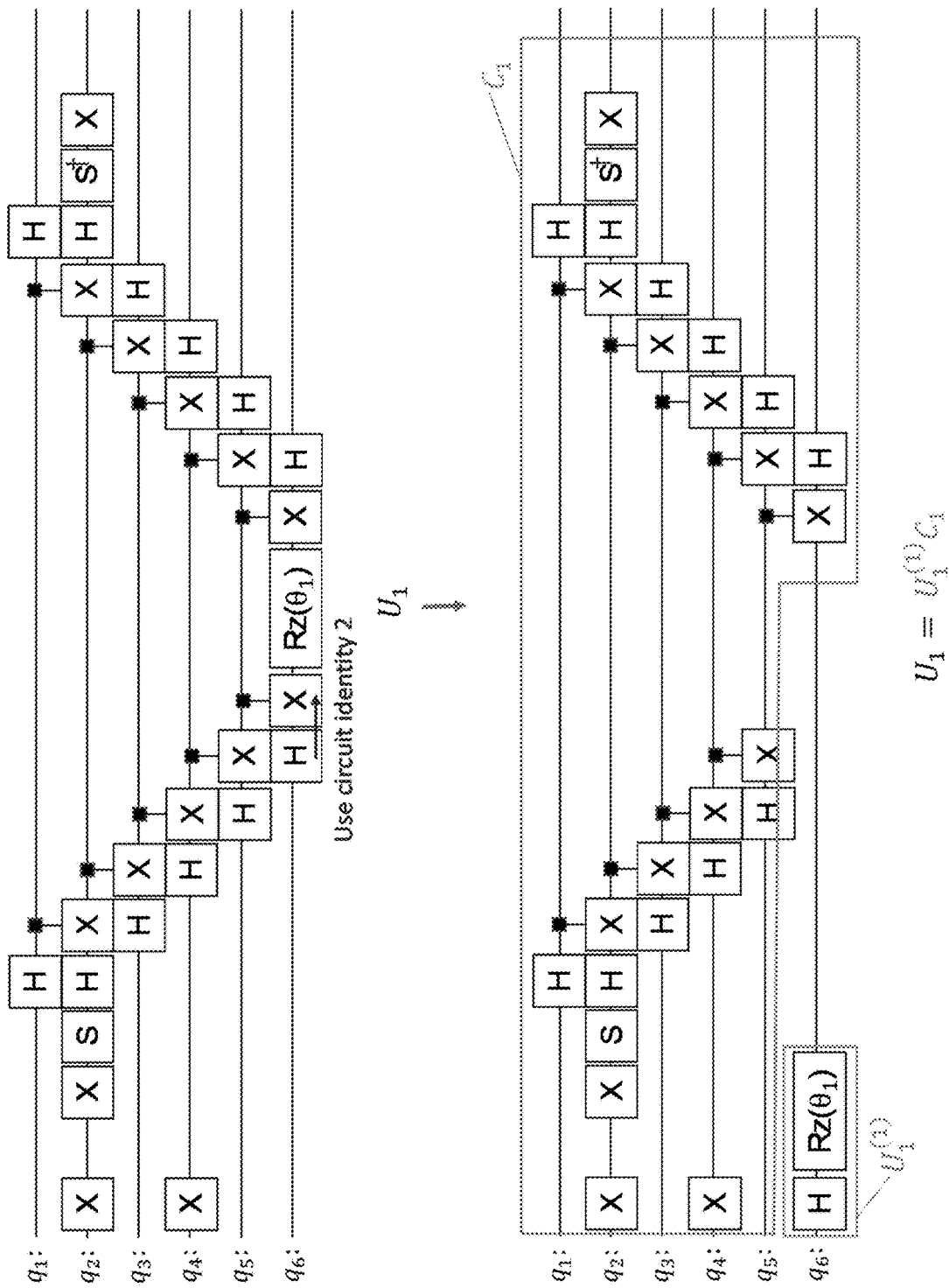
FIG. 6 illustrates a partial transformation of the quantum circuit of FIG. 5 by the quantum circuit reduction system of FIG. 3, in accordance with one or more embodiments described herein.

This decomposition is depicted illustratively at FIG. 6, showing the non-decomposed first operator, $U_1$, corresponding to the exponential of the first Pauli operator acting on initial bitstring state $|\psi_0\rangle$, and the decomposed/revised first operator $U_1^{(1)}$. The decomposition by the decomposition component 316 can employ one or more circuit identities. For example, circuit identity 2 (schematic 702 at FIG. 7) can be employed to push a Hadamard gate (H gate) through a controlled-X (CX) gate, resulting in creation and elimination of the CZ gate, such as due to its trivial action, and generation of the revised first operator $U_1^{(1)}$ comprising the H gate and the $Rz(\theta_1)$ gate. It is noted that the circuit identities can be identified by the identification component 312 and communicated to the decomposition component 316.

More particularly, the decomposition can be performed using a framework that is described as follows. For the set of m-qubits, one can initiate a variable called free-qubits as a list comprising of indices 1 to m. After incorporating the initial bitstring, the free qubits can be updated to reflect qubits that do not get acted upon by any gates in the circuit for the initial bit-string. With every Pauli operator, one can check the list of the free indices and determine if there is a sub-set of free indices that is acted upon by either X or Y Pauli operator in the given Pauli operator. If there exists such a sub-set, then the largest value of the indices in the subset can be picked and assigned as the parity collection qubit. Now using circuit identities 1, 2 and equivalence of parity circuits one can simplify the given circuit to get the decomposition into a non-Clifford and Clifford operators. The free qubit list is now updated to reflect the updated quantum circuit. If there exist no sub-set of free qubits that overlap in indices with X and Y operators of the Pauli operator, one can select the parity selection qubit to the central qubit of the non-identity single qubit Pauli operators of the given Pauli and all the gates after the Rz rotation form the Clifford operator in this case. This process can be repeated for each Pauli added in subsequent iterations.

In one or more embodiments, an analytical model, such as an artificial intelligence model, such as a machine learning model, can be employed to provide automatic selection rules, such as for determination of Clifford and non-Clifford parts of the quantum circuit decomposition. The analytical model can be trained by a training component, such as on pattern recognition of initial quantum circuits (e.g., non-reduced via the framework described herein).

Referring still to FIG. 7, another schematic 700 illustrates another circuit identity (circuit identity 1, where H gates can be pushed through a controlled-NOT (CNOT or CX) gate.

As a result of the decomposition of the first operator, a Clifford operator $C_1$ also results. That Clifford operator can be employed as part of a Clifford transformation by the transformation component 318. That is, the transformation component 318 can perform a first Clifford transformation of a primary operator of the quantum circuit, wherein the first Clifford transformation employs a result of the decomposition of the exponential of the first Pauli operator being the Clifford operator. This transformation can be represented by Equation 4.

Equation 4: $H^{(1)} = C_1^\dagger H C_1$, where $C_1$ is the first Clifford operator, H is the original primary operator, and $H^{(1)}$ is the once-revised primary operator (e.g., from the first iteration of operations 404-407).

The transformation component 318 further can perform additional Clifford transformations of other Pauli operators and operators corresponding to the exponential of other Pauli operators of the 1 to n Pauli operators (e.g., here, $U_2$ and $U_3$) by employing the result of the decomposition.

For example, a Pauli string to Pauli string conversion using a Clifford transformation can be represented generally by for C ∈ {Clifford gates}; $C^\dagger P_a C = P_b$, where $P_a$ is the original Pauli operator and $P_b$ is the transformed Pauli operator, with the subscripts a and b meant to represent two generic m-qubit Pauli operators.

It is noted that a quantum computation involving gates from the Clifford gate set (e.g., I, X, Y, Z, H, S, S†, CNOT, CZ and/or Swap Gate) and measurements in standard basis can be simulated using probabilistic classical computers in polynomial time, where suitable. Indeed, simulating Clifford transformations of Pauli strings can be classically efficient.

As used herein, standard basis can be the basis created by the eigen-vectors of the Z Pauli operator. For m-qubit system the standard basis then represents the basis created by the eigen-vectors of the Pauli operator given by $Z^{\otimes m}$. As used herein, "classically efficient" can refer to frameworks that can perform transformation of a given Pauli $P_a$ to another Pauli $P_b$ using a Clifford operator ($C^\dagger P_a C = P_b$) using computing resources and/or time that scales only polynomially in the number of qubits.

Relative to the quantum circuit 340 having three Pauli operators, Equation 5 below represents the initial quantum circuit 340 first transformed via the decomposition of the first operator and by Clifford operator application. Equation 6 represents the resultant revised description of the quantum circuit, from the first iteration of the set 403 of operations 404-406.

$$\langle \psi_0 | U_1^\dagger U_2^\dagger U_3^\dagger | H | U_3 U_2 U_1 | \psi \rangle = \langle \tilde{\psi}_0 | U_1^{(1)}$$
$$\setminus C_1^\dagger U_2^\dagger C_1 C_1^\dagger U_3^\dagger C_1 C_1^\dagger H C_1 C_1^\dagger U_3 \setminus C_1 C_1^\dagger$$
$$U_2 C_1 U_1^{(1)} | \tilde{\psi}_0 \rangle, \text{ and} \quad\quad \text{Equation 5:}$$

$$\langle \tilde{\psi}_0 | U_1^{(1)\setminus} C_1^\dagger U_2 \setminus C_1 C_1 \setminus U_3 \setminus C_1 C_1^\dagger H C_1 C_1 C_1 \setminus U_3 C_1 C_1 \setminus$$
$$U_2 C_1 U_1^{(1)} | \tilde{\psi}_0 \rangle = \langle \tilde{\psi}_0 | U_1^{(1)\setminus} U_2^{(1)\setminus} U_3^{(1)\setminus} H^{(1)} U_3^{(1)}$$
$$U_2^{(1)} U_1^{(1)} | \tilde{\psi}_0 \rangle, \quad\quad \text{Equation 6:}$$

where $U_k^{(1)} = e^{i2\theta_k P_k(1)}$ and $P_k^{(1)} = C_1^\dagger P_k C_1$ for k=2, 3 and where the second and third Paulis after Clifford transformation can be represented by $P_2^{(1)} = XYXXIY$, $P_3^{(1)} = XYIIIY$. The symbol represents a complex conjugate of a function (e.g., Clifford operator, Pauli operator and/or the like). It is noted that if additional phase is generated by the respective Clifford transformation(s), such additional phase can be absorbed in the rotation angle.

Figure 8:
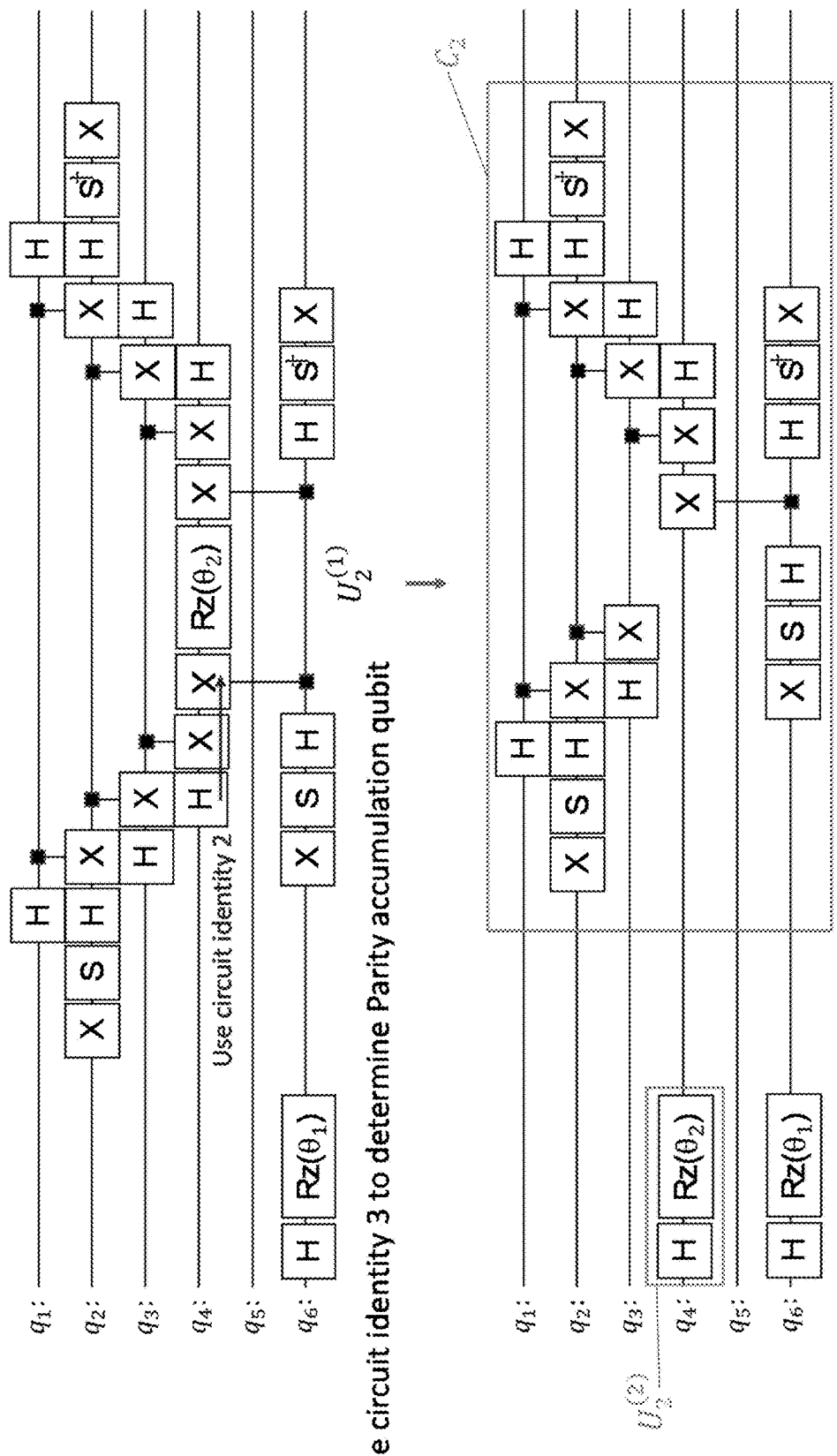
FIG. 8 illustrates another partial transformation of the quantum circuit of FIG. 5 by the quantum circuit reduction system of FIG. 3, in accordance with one or more embodiments described herein.
Figure 9:
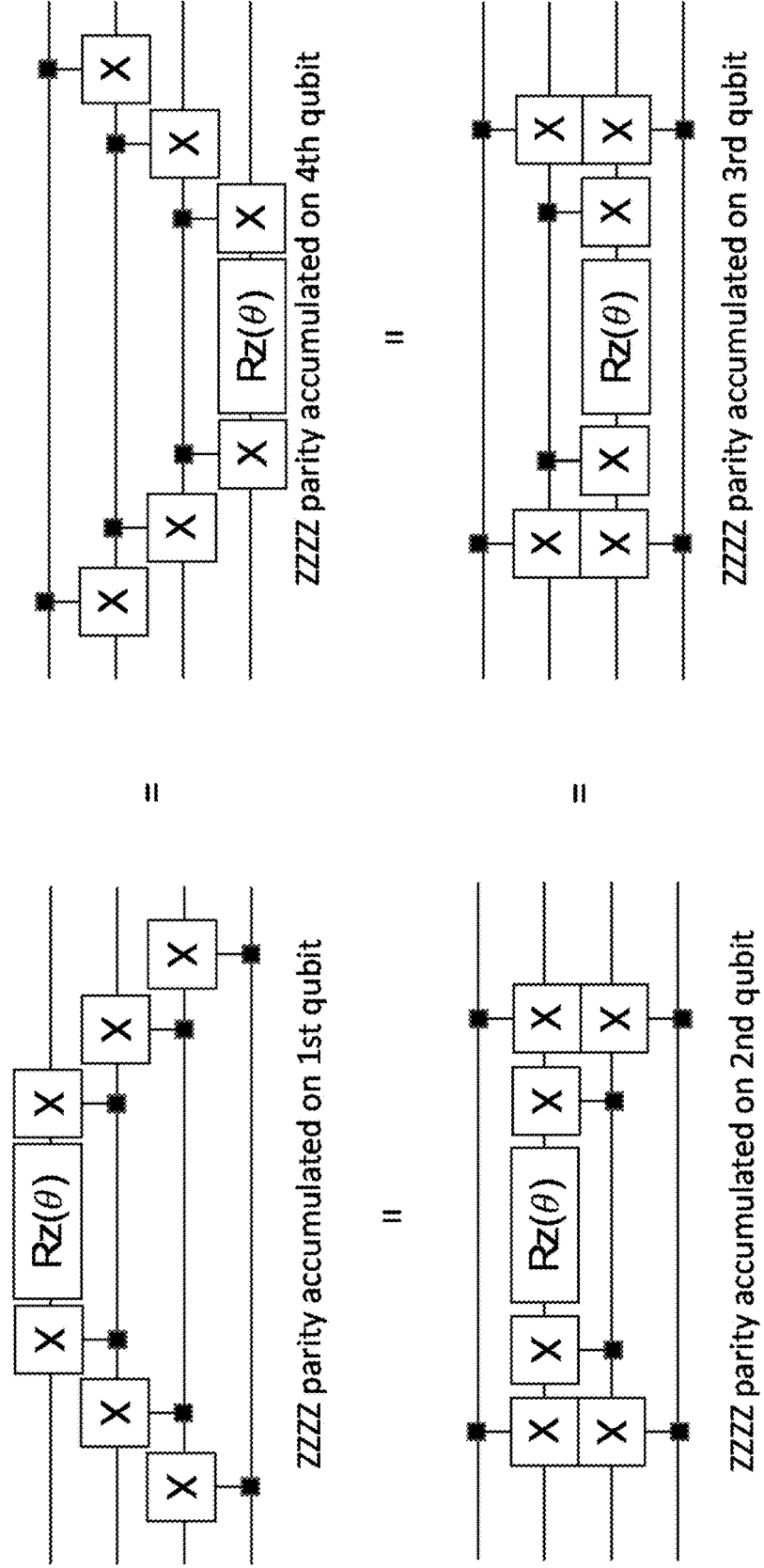
FIG. 9 illustrates additional circuit identities that can be employed by the quantum circuit reduction system of FIG. 3, in accordance with one or more embodiments described herein.

Turning next to FIG. 8, a second iteration of operations 404 to 407 can be performed by the decomposition component 316 and the transformation component 318. The revised second operator $U_2^{(2)}$ can be decomposed by the decomposition component 316. In an example, the revised second operator can be represented by $U_2^{(1)} = e^{i2\theta_2 P_2(1)}$ where decomposition results in $U_2 = U_2^{(2)} C_2$, where $C_2$ is a second Clifford operator.

This decomposition is depicted illustratively at FIG. 8, showing the non-decomposed revised (e.g., once revised) second operator UP) and the decomposed/revised second operator $U_2^{(2)}$ (e.g., twice revised). The decomposition by the decomposition component 316 can employ one or more circuit identities. For example, a circuit identity 3 (schematic 900 at FIG. 9) can be employed to determine the particular Parity collection qubit (e.g., as indicated above) of the qubit logic circuit to be employed for execution of the quantum circuit on a quantum system.

Additionally, circuit identity 2 (schematic 702 at FIG. 7) can be employed to push a Hadamard gate (H gate) through a controlled-X (CX or CNOT) gate, resulting in the creation and elimination of the CZ gate, such as due to its trivial action, and generation of the revised second operator $U_2^{(2)}$ comprising the H and $Rz(\theta_2)$ gates. It is noted that the circuit identities can be identified by the identification component 312 and communicated to the decomposition component 316.

As a result of the decomposition of the second revised operator, a Clifford operator $C_2$ results. That Clifford operator $C_2$ can be employed as part of a Clifford transformation by the transformation component 318. That is, the transformation component 318 can perform a second Clifford transformation of a primary operator of the quantum circuit, wherein the second Clifford transformation employs a result of the decomposition of the second revised operator being the Clifford operator. This transformation can be represented by Equation 7.

Equation 7: $H^{(2)} = C_2^\dagger H^{(1)} C_2$, where $C_2$ is the second Clifford operator, $H^{(1)}$ is the once-revised primary operator (e.g., from the first iteration of operations 404-407), and $H^{(2)}$ is the twice-revised primary operator (e.g., from the second iteration of operations 404-407).

The transformation component 318 further can perform additional Clifford transformations of exponentials of other operators of the revised 1 to n Pauli operators (e.g., here, only $U_3^{(1)}$) by employing the result of the decomposition.

Relative to the quantum circuit 340 having three Pauli operators, Equation 8 below represents the next revision of the initial quantum circuit 340 (e.g., result of Equation 6) transformed via the decomposition of the second revised operator and by partial Clifford operator application. Equation 9 represents the resultant revised quantum circuit, from the second iteration of the set 403 of operations 404-407.

$$\langle \psi_0 | U_1^\dagger U_2^\dagger U_3^\dagger H^{(1)} U_3^{(1)} U_2^{(1)} U_1^{(1)} | \psi \rangle = \langle \tilde{\psi}_0 | U_1^{(1)}$$
$$\setminus U_2^{(2)\dagger} C_2^\dagger U_3^{(1)\dagger} C_2 C_2^\dagger H^{(1)} C_2 C_2^\dagger U_3^{(1)}$$
$$C_2 U_2^{(1)} | \tilde{\psi}_0 \rangle, \text{ and} \quad\quad \text{Equation 8:}$$

$$\langle \tilde{\psi}_0 | U_1^{(1)\setminus} U_2^{(2)\setminus} C_2 \setminus U_3^{(1)\setminus} C_2 C_2^\dagger H^{(1)} C_2 C_2 \setminus U_3^{(1)} \setminus C_2 U_1^{(1)}$$
$$U_2^{(2)} U_1^{(1)} | \tilde{\psi}_0 \rangle = \langle \tilde{\psi}_0 | U_1^{(1)\setminus} U_2^{(2)\setminus} U_3^{(2)\setminus} H^{(2)} U_3^{(2)}$$
$$U_2^{(2)} U_1^{(1)} | \tilde{\psi}_0 \rangle, \quad\quad \text{Equation 9:}$$

where $U_k^{(2)}$ $e^{i2\theta_k P_k(2)}$ and $P_k^{(2)} = C_2^\dagger P_k^{(1)} C_2$, for k=3 and where the third Pauli after Clifford transformation can be represented by $P_3^{(2)} = XYIIIY$. The symbol t represents complex conjugate of a function (e.g., Clifford operator, Pauli operator and/or the like).

Figure 10:
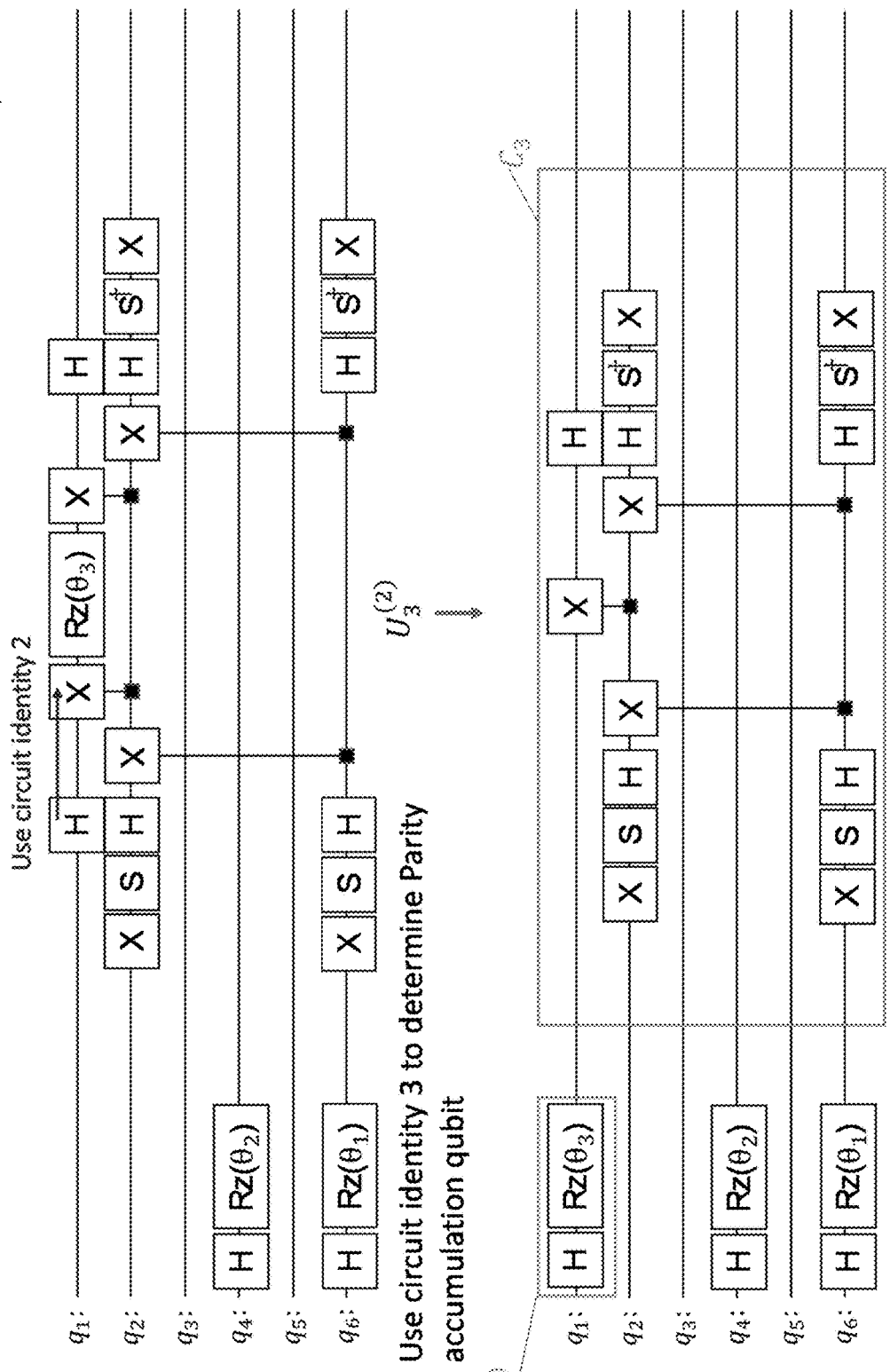
FIG. 10 illustrates yet another partial transformation of the quantum circuit of FIG. 5 by the quantum circuit reduction system of FIG. 3, in accordance with one or more embodiments described herein.

Turning next to FIG. 10, a third iteration of operations 404 to 407 can be performed by the decomposition component 316 and the transformation component 318. More generally, such iterations can be performed for all Pauli operators and operators corresponding to the exponentials of Pauli operators 1 to n, one at a time, of a quantum circuit until each exponential of the Pauli operators 1 to n has been decomposed, and with the corresponding Clifford transformations having been performed.

The revised third operator $U_3^{(2)}$ can be decomposed by the decomposition component 316. In an example, the twice revised third operator can be represented by $U_3(2) = e^{i2\theta_3 P_3(2)}$ where decomposition results in $U_3^{(2)} = U_3^{(3)} C_3$, where $C_3$ is a third Clifford operator.

This decomposition is depicted illustratively at FIG. 10, showing the non-decomposed revised (e.g., twice-revised, here) third operator $U_3^{(2)}$ and the decomposed/revised third operator $U_3^{(3)}$ (e.g., three times revised). The decomposition by the decomposition component 316 can employ one or more circuit identities. For example, a circuit identity 3 (schematic 900 at FIG. 9) can be employed to determine the particular Parity collection qubit (e.g., as described above) of the qubit logic circuit to be employed for execution of the quantum circuit on a quantum system.

Additionally, circuit identity 2 (schematic 702 at FIG. 7) can be employed to push a Hadamard gate (H gate) through a controlled-X (CX or CNOT) gate, resulting in the creation and elimination of the CZ gate, such as due to its trivial action, and generation of the revised third operator $U_3^{(3)}$ comprising the H and $Rz(\theta_3)$ gates. It is noted that the circuit identities can be identified by the identification component 312 and communicated to the decomposition component 316.

As a result of the decomposition of the third operator, a Clifford operator $C_3$ results. That Clifford operator $C_3$ can be employed as part of a Clifford transformation by the transformation component 318. That is, the transformation component 318 can perform a third Clifford transformation of a primary operator of the quantum circuit, wherein the first Clifford transformation employs a result of the decomposition of the first operator being the Clifford operator. This transformation can be represented by Equation 10.

Equation 10: $H^{(3)} = C_3^\dagger H^{(2)} C^3$, where $C_3$ is the third Clifford operator, $H^{(2)}$ is the twice-revised primary operator (e.g., from the first two iterations of operations 404-407), and $H^{(3)}$ is the thrice-revised primary operator (e.g., from the first three iterations of operations 404-407).

The transformation component 318 further can perform additional Clifford transformations of other Pauli operators and corresponding operators generated by exponentiating the revised Pauli operators of the 1 to n Pauli operators if there are any remaining. However, relative to the present example, no non-decomposed Pauli operators remain.

Figure 11:
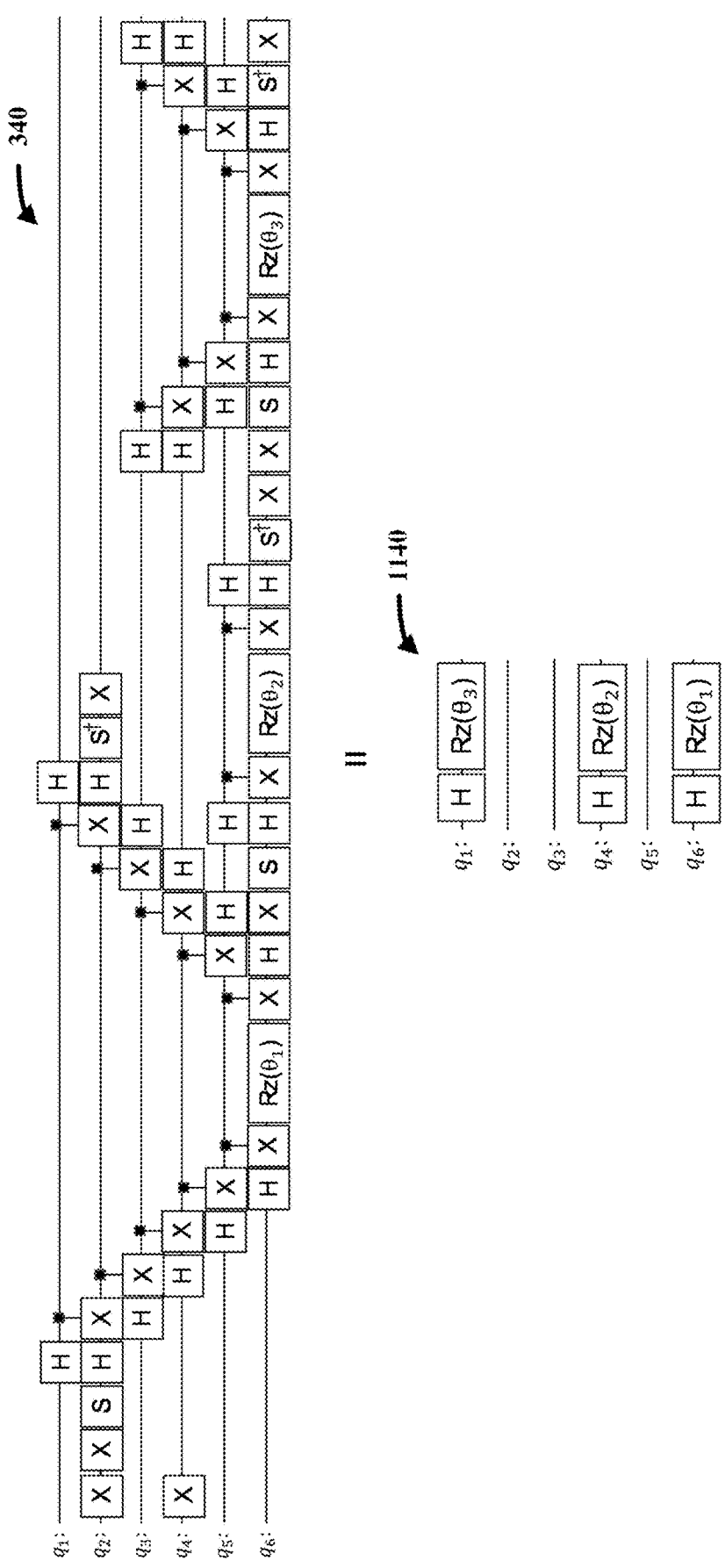
FIG. 11 schematically illustrates the initial quantum circuit of FIG. 5 transformed, in accordance with one or more embodiments described herein.

Turning finally to FIG. 11, illustrated is a schematic 1100 showing the initial quantum circuit 340 and the final reduced quantum circuit 1140. The final reduced quantum circuit 1140 can be performed on a classical and/or quantum system with greatly reduced cost as compared to an execution of the non-reduced initial quantum circuit 340. The final reduced quantum circuit can be represented by Equation 11.

$$\langle \psi_0 | U_1^{(1)\dagger} U_2^{(2)\dagger} U_3^{(2)\dagger} H^{(2)} U_3^{(2)} U_2^{(2)} U_1^{(1)} | \psi \rangle =$$
$$\langle \tilde{\psi}_0 | U_1^{(1)\dagger} U_2^{(2)\dagger} U_3^{(3)\dagger} C_3^\dagger H^{(2)} C_3 U_3^{(3)} U_2^{(2)} U_1^{(1)}$$
$$| \tilde{\psi}_0 \rangle = \langle \tilde{\psi}_0 | U_1^{(1)\dagger} U_2^{(2)\dagger} U_3^{(3)\dagger} H_3 U_3^{(3)} U_2^{(2)} U_1^{(1)}$$
$$| \tilde{\psi}_0 \rangle \quad \text{Equation 11:}$$

In one example, the final reduced quantum circuit 1140 can be input as part of a quantum job request 224 and/or identified for executing a quantum job request 224, such as by a quantum system 201. Indeed, the description of the quantum circuit reduction system 102 at FIG. 2 can apply to the quantum circuit reduction system 302 of FIG. 3, where the quantum circuit reduction system 302 can replace the quantum circuit reduction system 102 at FIG. 2.

The final reduced quantum circuit 1140 can be executed employing the quantum processor 206, with quantum measurement readout 220 having reduced error as compared to execution of the initial, non-reduced quantum circuit 340.

Additionally and/or alternatively, the final reduced quantum circuit 1140 can be executed at the classical system 241, where feasible, with a resultant quantum measurement readout having reduced error as compared to execution of the initial, non-reduced quantum circuit 340.

Turning again briefly to FIG. 4, it is noted that the operations 402-407 can be performed automatically by a classical system and/or by a quantum system. For example, one or more exemplary steps for executing a global permutation of Pauli operators (operation 402), such as by the permutation component 314, can comprise:
1. Input: List of Pauli strings
2. num_pauli (n)=len(list of pauli strings)
3. num_qubits (m)=len(each pauli)
4. Index=[n, n, . . . , n] (m times)
5. For k in num_qubits:
6. pos_k=record the position of first occurrence of 'I' for qubit k
7. Index[k]=pos_k
8. If degeneracies in Index:
9. Repeat step in line 6 for qubits with degeneracies till next 'I'
10. Update Index
11. Repeat till degeneracies are resolved
12. Permutation: sort Index in ascending order
13. Output: Permutation Likewise, one or more exemplary steps for executing one iteration of the Pauli decomposition and Clifford transformation, such as respectively by the decomposition component 316 and transformation component 318, can comprise:
1. Input: permuted H, list of permuted Pauli strings, permuted initial bitstring
2. num_pauli (n): len(list of pauli strings)
3. num_qubits (m): len(each pauli)
4. Initial circuit: circuit obtained from permuted initial bitstring
5. Ansatz: empty quantum circuit with m qubits
6. Free_qubits=qubits not acted upon by any gates in initial circuit
7. pauli=pauli_list[1]
8. For count in len(pauli_list):
9. H_cliff=permuted H
10. clf_ckt=empty quantum circuit with m qubits
11. pauli_qubit_indices: qubit indices on which pauli string acts
12. pauli_int_free_indices: free qubit indices that intersect with pauli indices
13. H_on_free_qubit: free qubit indices that intersect with pauli qubits having 'X' or 'Y'
14. If len(H_on_free_qubit) is not zero:
15. parity_qubit=H_on_free_qubit[last entry]
16. anz_to_add, clf_ckt_to_add=get_reduced_ckt (pauli, parity_qubit)
17. If first pauli:
18. clf_ckt=clf_ckt+Initial circuit
19. else:
20. parity_qubit=middle qubit of pauli
21. anz_to_add, clf_ckt_to_add=get_split_ckt(pauli, parity_qubit)
22. If first pauli:
23. anz=anz+Initial circuit
24. anz=anz+anz_to_add
25. clf_ckt=clf_ckt+clf_ckt_to_add
26. H_cliff=Clifford_transform_qubit_op(clf_ckt, H_cliff)
27. pauli=Clifford_transform_pauli(clf_ckt, pauli_list [count+1: end])[1]
28. Update free_qubits Turning next to FIGS. 12 and 13, example graphs illustrate reduction of CX (or CNOT) gates and circuit depth of quantum circuits using a quantum circuit reduction framework described herein, as compared to the respective non-reduced quantum circuits. Repetitive description of like elements and/or processes employed in respective embodiments is omitted for sake of brevity.

Figure 12:
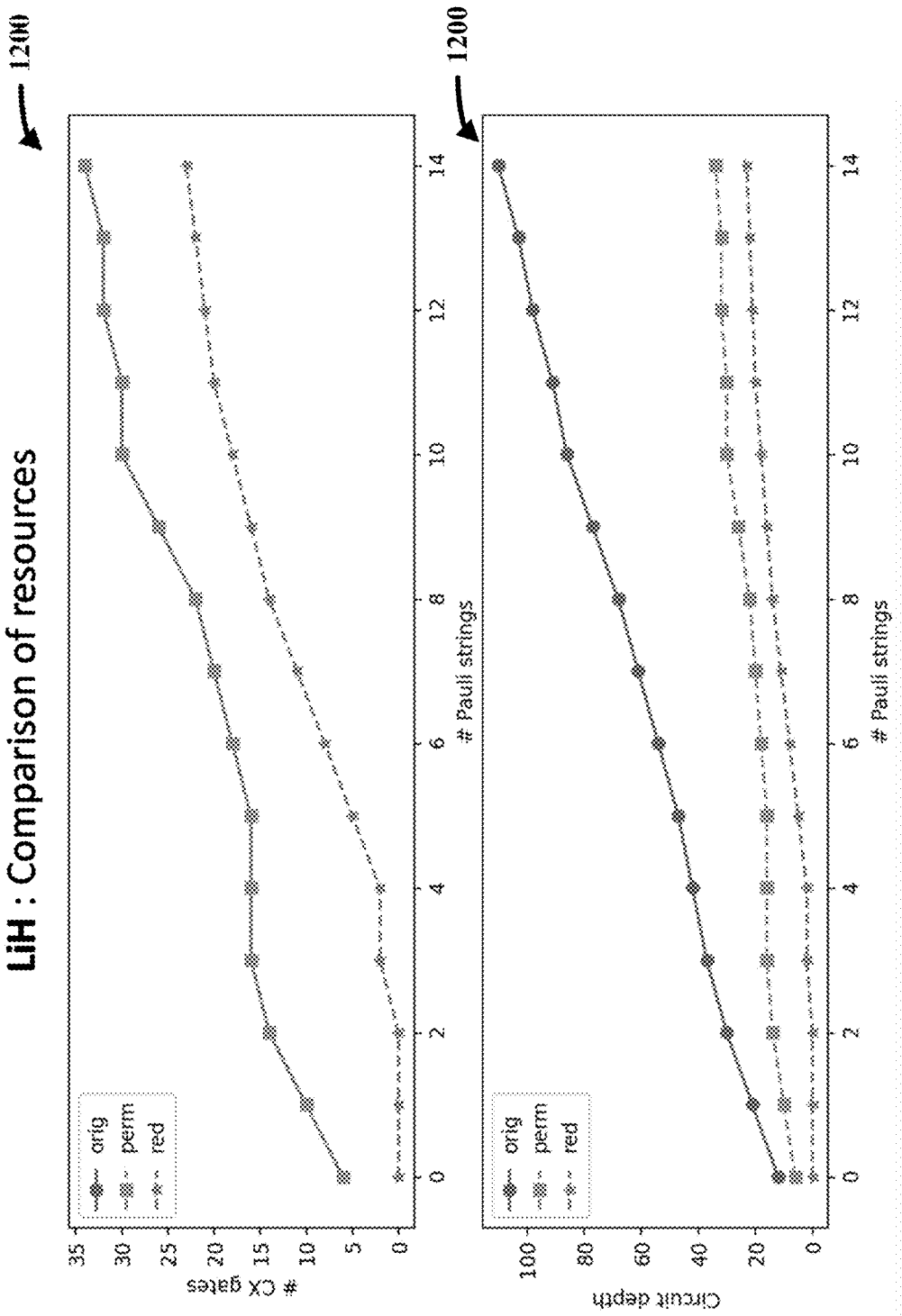
FIG. 12 illustrates a pair of graphs demonstrating efficiencies provided by a quantum circuit reduction framework discussed herein, in accordance with one or more embodiments described herein.

At FIG. 12, quantum circuits for lithium hydride (LiH) are illustrated at graph 1200 and 1210. Graph 1200 illustrates difference in CX gates over different number of Pauli strings in the wavefunction. Graph 1210 illustrates difference in circuit depth over different number of Pauli strings in the wavefunction. As shown in the key, the original (non-permutated and non-reduced) quantum circuit is represented by a line including circle marks, the permutated (and non-reduced) quantum circuit (e.g., permutation of the original circuit) is represented by a line including square marks, and the reduced quantum circuit (e.g., permutated and reduced original circuit) is represented by a line including star marks. At graph 1200 it is noted that the original quantum circuit and permutated quantum circuit overlap.

As illustrated, use of a quantum circuit reduction framework as described herein can greatly reduce the number of CX gates and circuit depth of a quantum circuit operated upon.

Figure 13:
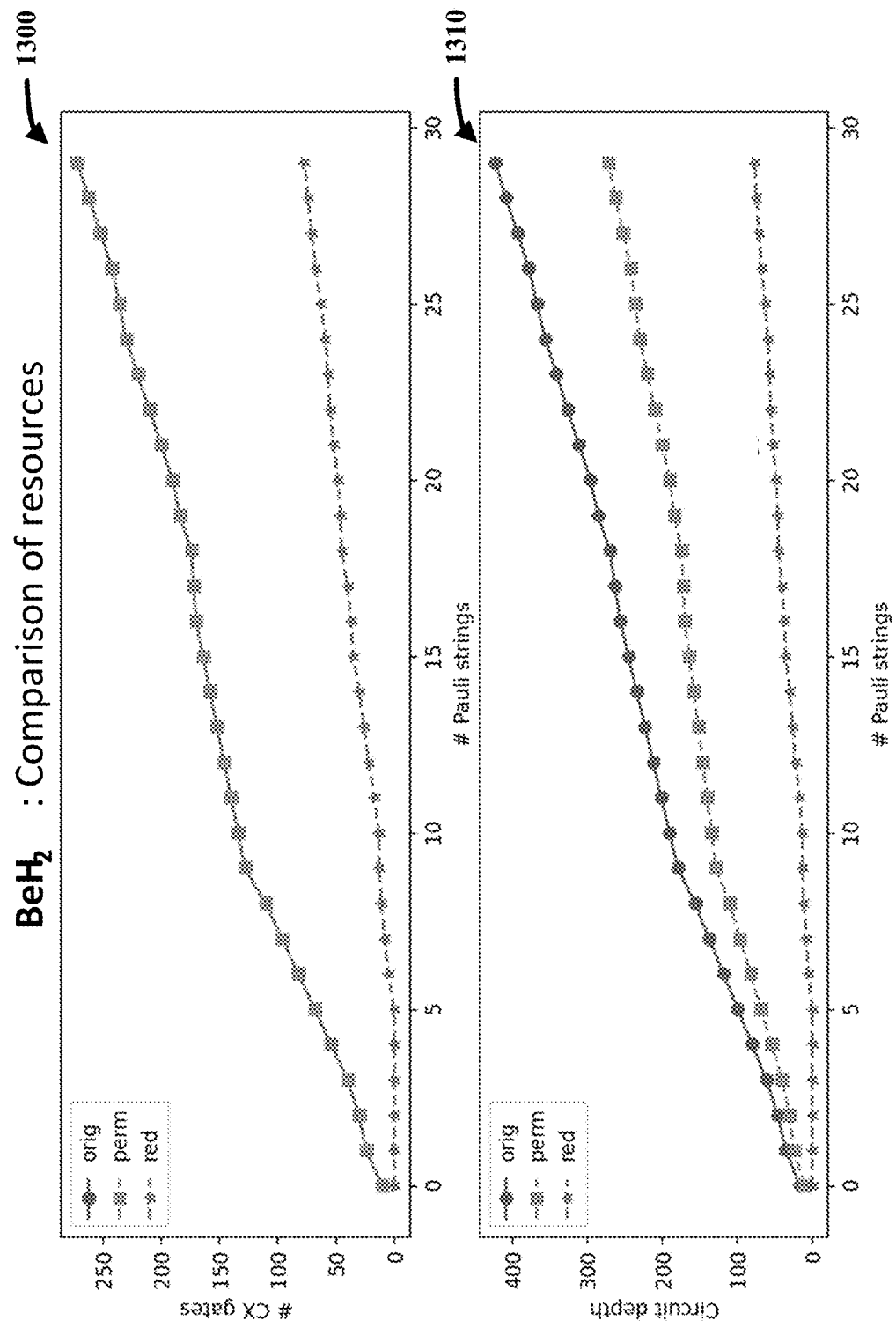
FIG. 13 illustrates another pair of graphs demonstrating efficiencies provided by a quantum circuit reduction framework discussed herein, in accordance with one or more embodiments described herein.

At FIG. 13, quantum circuits for beryllium hydride (BeH$_2$) are illustrated at graph 1300 and 1310. Graph 1300 illustrates difference in CX gates over different number of Pauli strings. Graph 1310 illustrates difference in circuit depth over different number of Pauli strings in the wavefunction. As shown in the key, the original (non-permutated and non-reduced) quantum circuit is represented by a line including circle marks, the permutated (and non-reduced) quantum circuit (e.g., permutation of the original circuit) is represented by a line including square marks, and the reduced quantum circuit (e.g., permutated and reduced original circuit) is represented by a line including star marks.

Regarding the graphs 1300 and 1310 of FIG. 13, it is noted that for a 10 qubit problem, after inclusion of 30 Pauli strings with circuit reduction, two qubits remain free.

As illustrated, use of a quantum circuit reduction framework as described herein can greatly reduce the number of CX gates and circuit depth of a quantum circuit operated upon. In addition the reduced quantum circuit can be found to be operable on a reduced qubit count, such as 8 qubits as compared to 10 qubits, as compared to the original non-reduced quantum circuit, in correspondence to the circuit width reduction.

Figure 14:
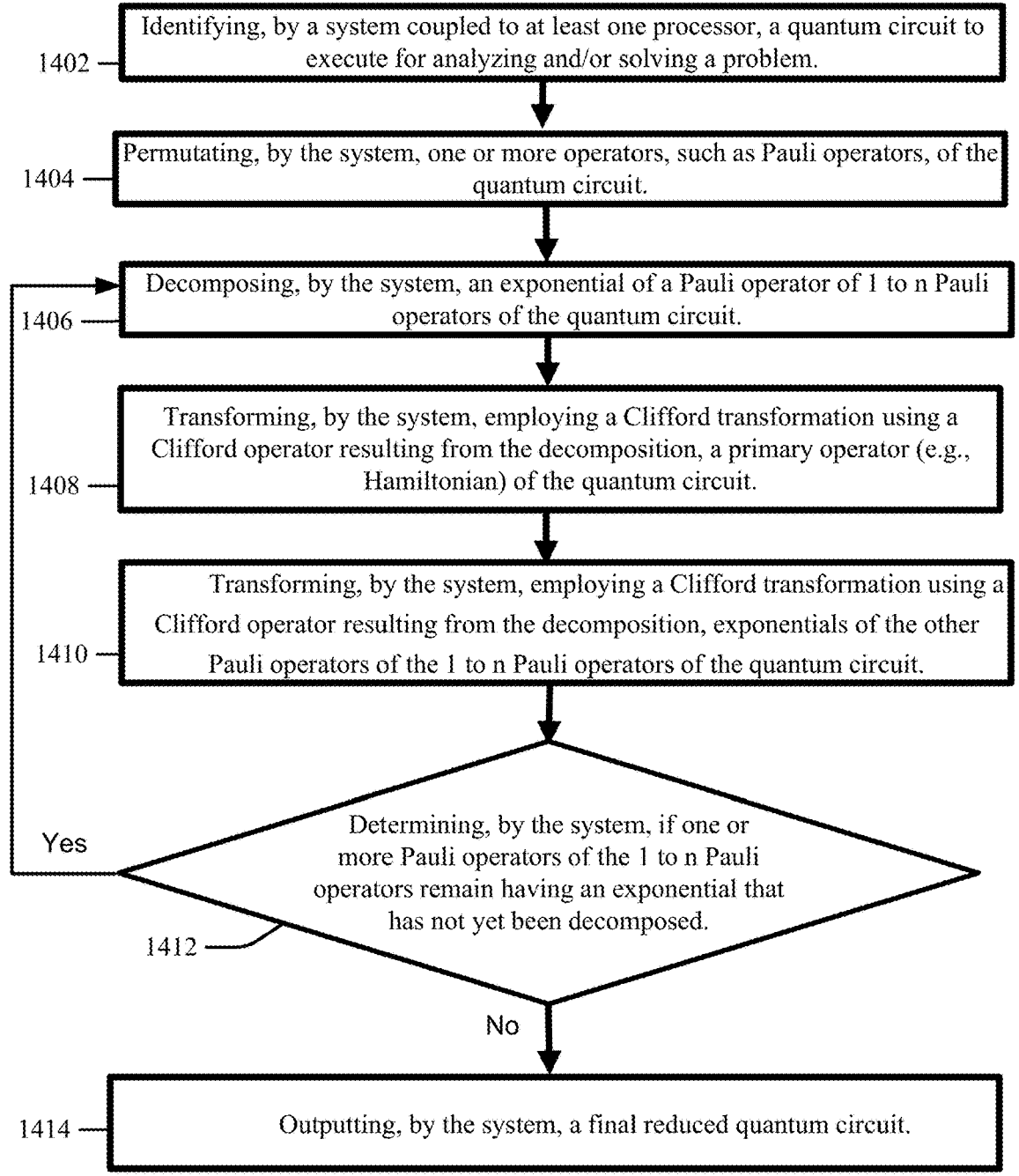
FIG. 14 illustrates a flow diagram of an example, non-limiting computer-implemented method that can facilitate quantum circuit reduction, in accordance with one or more embodiments described herein.

Referring next to FIG. 14, illustrated is a flow diagram of an example, non-limiting computer-implemented method 1400 that can facilitate the reduction of a quantum circuit (e.g., circuit depth, width and/or total number of circuit operations), in accordance with one or more embodiments described herein. Repetitive description of like elements and/or processes employed in respective embodiments is omitted for sake of brevity.

Looking first to 1402 at FIG. 14, the non-limiting computer-implemented method 1400 can comprise identifying, by a system (e.g., identification component 312) coupled to at least one processor, a quantum circuit to execute for analyzing and/or solving a problem, such as represented by a quantum algorithm.

Looking to 1404, the non-limiting computer-implemented method 1400 can comprise permutating, by the system (e.g., permutation component 314), one or more operators, such as Pauli operators, of the quantum circuit (e.g., quantum circuit 340) and correspondingly permuting the primary operator and the initial bit-string.

Looking to 1406, the non-limiting computer-implemented method 1400 can comprise decomposing, by the system (e.g., decomposition component 316), an exponential of a Pauli operator of 1 to n Pauli operators of the quantum circuit.

At 1408, the non-limiting computer-implemented method 1400 can comprise transforming, by the system (e.g., transformation component 318), employing a Clifford transformation using a Clifford operator resulting from the decomposition, a primary operator (e.g., Hamiltonian operator, measurement operator, and/or the like) of the quantum circuit.

At 1410, the non-limiting computer-implemented method 1400 can comprise transforming, by the system (e.g., transformation component 318), employing Clifford transformation using a Clifford operator resulting from the decomposition, exponentials of the other Pauli operators of the 1 to n Pauli operators of the quantum circuit.

At 1412, the non-limiting computer-implemented method 1400 can comprise determining, by the system (e.g., processor 306 and/or decomposition component 316), if one or more Pauli operators of the 1 to n Pauli operators remain having an exponential that has not yet been decomposed.

If yes, the non-limiting computer-implemented method 1400 continues back to operations 1406 through 1410.

If no, the non-limiting computer-implemented method 1400 continues to operation 1414.

At 1414, the non-limiting computer-implemented method 1400 can comprise outputting, by the system (e.g., transformation component 318), a final reduced quantum circuit.

Figure 15:
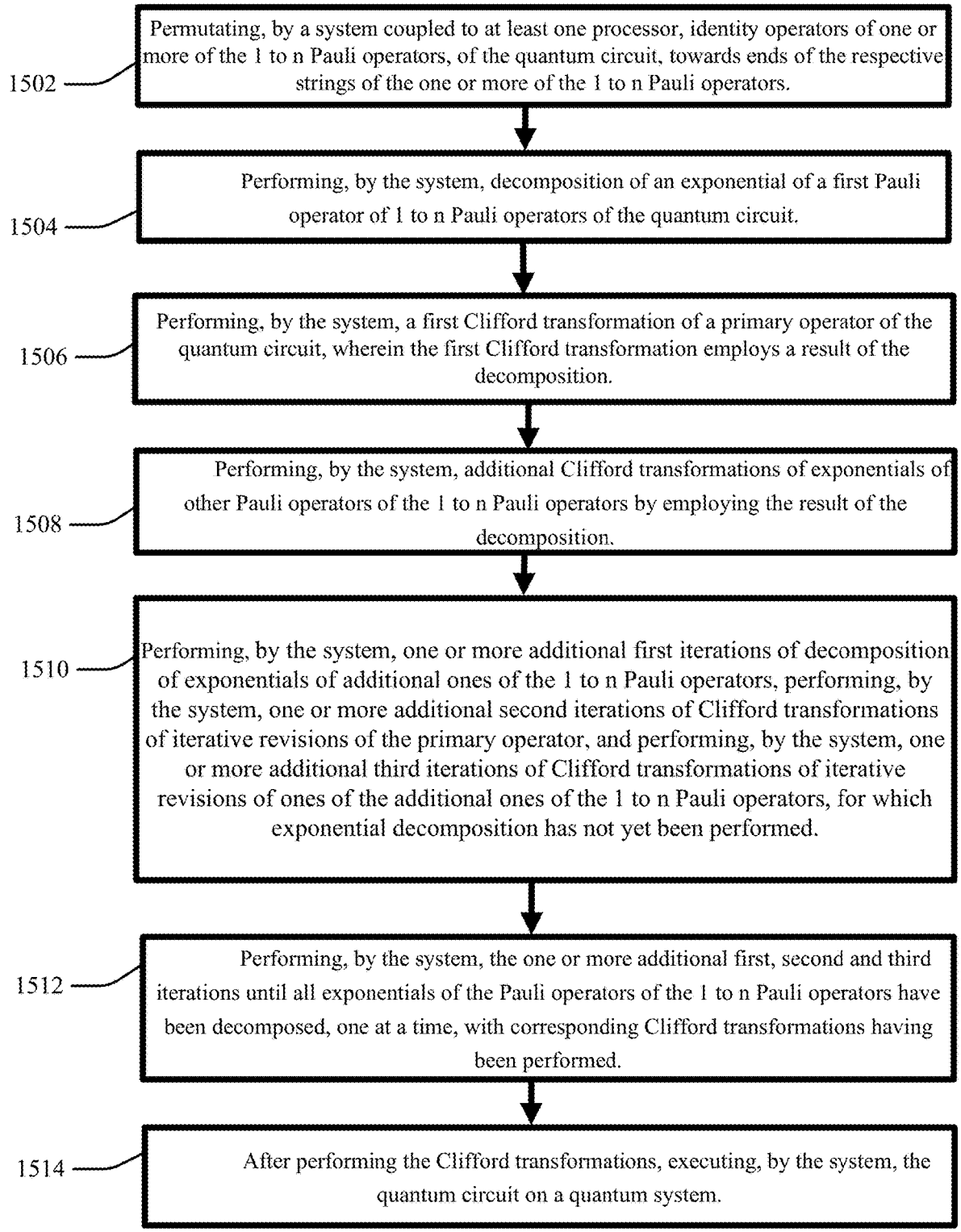
FIG. 15 illustrates a flow diagram of another example, non-limiting computer-implemented method that can facilitate quantum circuit reduction, in accordance with one or more embodiments described herein.

Referring next to FIG. 15, illustrated is a flow diagram of an example, non-limiting computer-implemented method 1500 that can facilitate the reduction of a quantum circuit (e.g., circuit depth and/or width), in accordance with one or more embodiments described herein. Repetitive description of like elements and/or processes employed in respective embodiments is omitted for sake of brevity.

At 1502, the non-limiting computer-implemented method 1500 can comprise permutating, by a system (e.g., permutation component 314) coupled to at least one processor, identity operators of one or more of the 1 to n Pauli operators, of the quantum circuit, towards ends of the respective strings of the one or more of the 1 to n Pauli operators. Corresponding permutation of the primary operator and input bitstring state also can be performed.

At 1504, the non-limiting computer-implemented method 1500 can comprise performing, by the system (e.g., decomposition component 316), decomposition of an exponential of a first Pauli operator of 1 to n Pauli operators of the quantum circuit. The decomposing can comprise decomposing the exponential of the first Pauli operator into a first non-Clifford operator and a first Clifford operator.

At 1506, the non-limiting computer-implemented method 1500 can comprise performing, by the system (e.g., transformation component 318), a first Clifford transformation of a primary operator of the quantum circuit, wherein the first Clifford transformation employs a result of the decomposition. The first Clifford transformation can employ the first Clifford operator.

At 1508, the non-limiting computer-implemented method 1500 can comprise performing, by the system (e.g., transformation component 318), additional Clifford transformations of exponentials of other Pauli operators of the 1 to n Pauli operators by employing the result of the decomposition. The additional Clifford transformations can employ the first Clifford operator.

At 1510, the non-limiting computer-implemented method 1500 can comprise performing, by the system (e.g., decomposition component 316), one or more additional first iterations of decomposition of exponentials of additional ones of the 1 to n Pauli operators, performing, by the system (e.g., transformation component 318), one or more additional second iterations of Clifford transformations of iterative revisions of the primary operator, and performing, by the system (e.g., transformation component 318), one or more additional third iterations of Clifford transformations of iterative revisions of ones of the additional ones of the 1 to n Pauli operators, for which exponential decomposition has not yet been performed.

At 1512, the non-limiting computer-implemented method 1500 can comprise performing, by the system (e.g., decomposition component 316 and transformation component 318), the one or more additional first, second and third iterations until all exponentials of the Pauli operators of the 1 to n Pauli operators have been decomposed, one at a time, with corresponding Clifford transformations having been performed.

At 1514, the non-limiting computer-implemented method 1500 can comprise after performing the additional Clifford transformations, executing, by the system (e.g., quantum operation component 203 and/or quantum processor 206), the quantum circuit on a quantum system (e.g., quantum system 201).

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art will understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring the computer-implemented methodologies to computers. The term article of manufacture, as used herein, is intended to encompass a computer program accessible from any computer-readable device or storage media.

In summary, computer-implemented methods, and/or computer program products to facilitate reduction of a quantum circuit are provided. According to an embodiment, a computer-implemented method can comprise performing, by a system operatively coupled to a processor, decomposition of an exponential of a first Pauli operator of 1 to n Pauli operators of the quantum circuit, and performing, by the system, a first Clifford transformation of a primary operator of the quantum circuit, where the primary operator can comprise a linear combination of primary Pauli operators, and where the first Clifford transformation can employ a result of the decomposition of the exponential of the first Pauli operator. Performing the decomposition can comprise decomposing, by the system, the exponential of the first Pauli operator into a first non-Clifford operator and a first Clifford operator, where the first Clifford operator can be the result of the decomposition employed for the first Clifford transformation of the primary operator. Additional decompositions and respective transformations can be performed iteratively until decomposition of all exponentials of the 1 to n Pauli operators.

One advantage of the one or more embodiments described herein can be overall reduction in cost of execution of a quantum circuit. More particularly, due to reduction of CNOT gate count, circuit width and/or circuit depth, execution time for a quantum circuit can be lowered, noise that can lead to estimation error can be reduced, more efficient use of qubit coherency time can be enabled, and/or reduction of memory and/or power can result.

Still another advantage of the one or more embodiments described herein can be provision of an automated frameworks for reduction of circuit depth, such as highly-used, common quantum algorithms. These can include VQE, QAOA, Trotter Formulae, circuit transpilation, and/or the like.

Another advantage of the one or more embodiments described herein can be an ability to perform hardware experiments on larger systems and/or on systems with a limited resource budget (e.g., qubit connections, hardware, controllers, and/or the like) as compared to execution of such same quantum circuits absent use of the one or more circuit reduction frameworks herein.

Yet another advantage of the one or more embodiments described herein can be improved performance of classical simulators. Indeed, one or more aspects of the frameworks discussed herein, as discussed above, can be employed on a classical computer and/or classical system. Improved performance of such classical system can stem from reduction of circuit complexity, such as including reduction of circuit depth, allowing for reduction in cost of use of such classical system.

In the examples above, it is also noted that scaling can be applied. That is, one or more quantum circuits can be operated on by a framework herein, such as at least partially in parallel to one another. Improved scaling can also apply to execution of the resulting reduced quantum circuits, such as at a quantum system. That is, reduction in quantum circuit CNOT gates and depth can allow for lowered execution times, reduced noise and error, increased execution of additional quantum circuits within available qubit coherency time, execution of two or more quantum circuits in parallel, and/or the like.

In view of the one or more embodiments described herein, a practical application of the devices described herein can be ability to reduce a quantum circuit, such as the circuit depth, circuit width, total number of quantum gates, and/or number of a particular type of quantum gate, such as CNOT gates. This can directly result in more efficient execution of the quantum circuit, such as comprising reduced memory, power, system noise generation and/or resultant estimation error, as compared to executing an initial/original non-reduced quantum circuit.

Furthermore, one or more embodiments described herein can be employed in a real-world system based on the disclosed teachings. For example, one or more embodiments described herein can function in connection with a classical and/or quantum system to solve one or more real-world problems, such as related to fields of chemistry, physics, biology and/or the like. Such problems can be represented as quantum algorithms, which quantum algorithms can be executed as one or more quantum circuits representing the quantum algorithms. In one example, a quantum system can receive as input a quantum job request and can measure a real-world qubit state of one or more qubits, such as superconducting qubits, of the quantum system by operating one or more gates of a quantum circuit having been reduced by one or more frameworks described herein. In another example, a classical system can receive as input a quantum job request and can produce an answer by executing one or more quantum gates of a reduced quantum circuit having been reduced by one or more frameworks described herein.

The systems and/or devices have been (and/or will be further) described herein with respect to interaction between one or more components. Such systems and/or components can include those components or sub-components specified therein, one or more of the specified components and/or sub-components, and/or additional components. Sub-components can be implemented as components communicatively coupled to other components rather than included within parent components. One or more components and/or sub-components can be combined into a single component providing aggregate functionality. The components can interact with one or more other components not specifically described herein for the sake of brevity, but known by those of skill in the art.

One or more embodiments described herein can be, in one or more embodiments, inherently and/or inextricably tied to computer technology and cannot be implemented outside of a computing environment. For example, one or more processes performed by one or more embodiments described herein can more efficiently, and even more feasibly, provide program and/or program instruction execution, such as relative to quantum circuit execution, as compared to existing systems and/or techniques. Systems, computer-implemented methods and/or computer program products facilitating performance of these processes are of great utility in the field of quantum circuit execution and/or quantum algorithm execution, and cannot be equally practicably implemented in a sensible way outside of a computing environment.

One or more embodiments described herein can employ hardware and/or software to solve problems that are highly technical, that are not abstract, and that cannot be performed as a set of mental acts by a human. For example, a human, or even thousands of humans, cannot efficiently, accurately and/or effectively reduce a quantum circuit and/or execute a reduced quantum circuit as the one or more embodiments described herein can facilitate this process. And, neither can the human mind nor a human with pen and paper perform one or more of these processes, as conducted by one or more embodiments described herein.

In one or more embodiments, one or more of the processes described herein can be performed by one or more specialized computers (e.g., a specialized processing unit, a specialized classical computer, a specialized quantum computer, a specialized hybrid classical/quantum system and/or another type of specialized computer) to execute defined tasks related to the one or more technologies describe above. One or more embodiments described herein and/or components thereof can be employed to solve new problems that arise through advancements in technologies mentioned above, employment of quantum computing systems, cloud computing systems, computer architecture and/or another technology.

One or more embodiments described herein can be fully operational towards performing one or more other functions (e.g., fully powered on, fully executed and/or another function) while also performing the one or more operations described herein.

Figure 16:
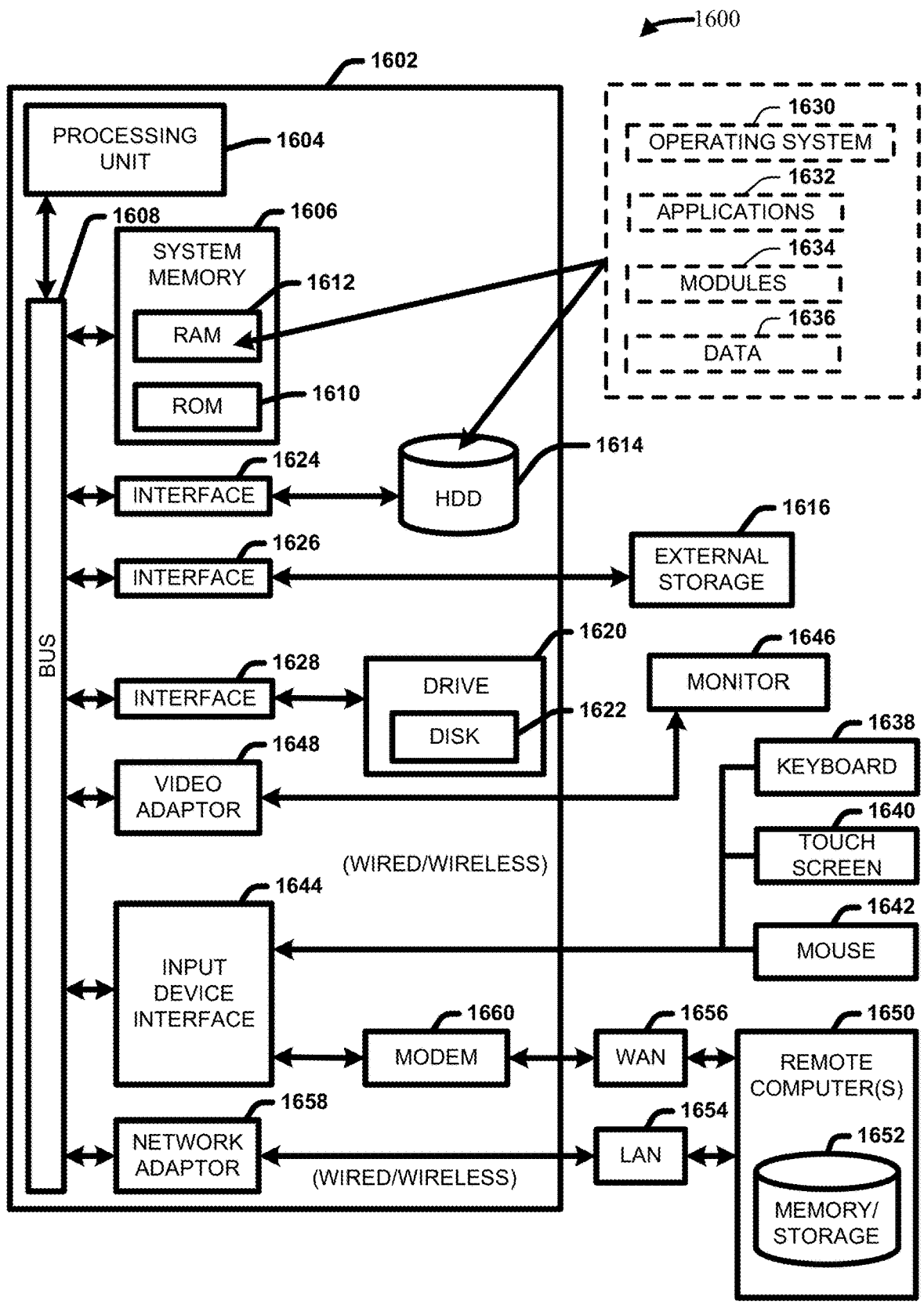
FIG. 16 illustrates a block diagram of an example, non-limiting operating environment in which one or more embodiments described herein can be facilitated.
Figure 17:
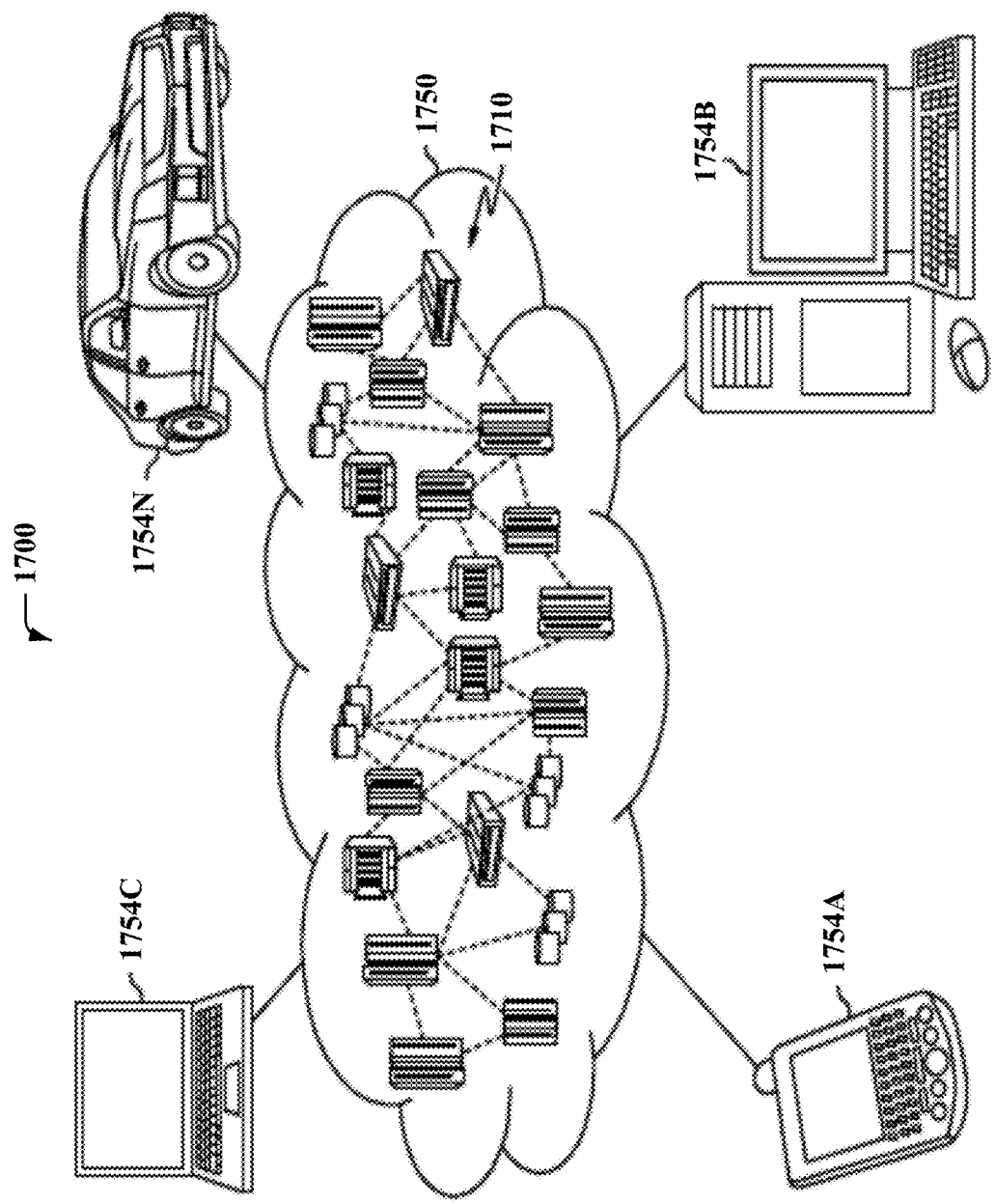
FIG. 17 illustrates a block diagram of an example, non-limiting cloud computing environment in accordance with one or more embodiments described herein.
Figure 18:
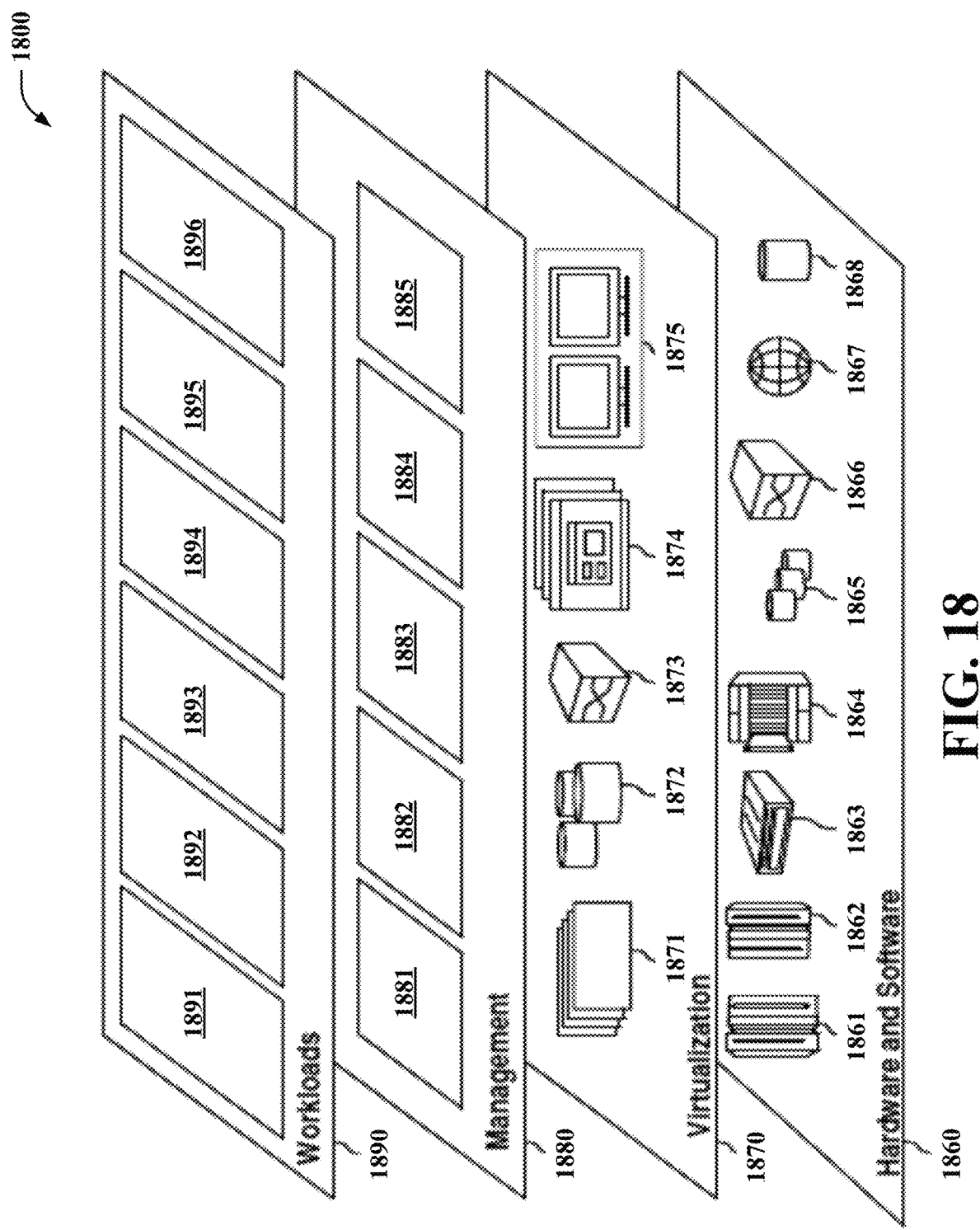
FIG. 18 illustrates a block diagram of a plurality of example, non-limiting abstraction model layers, in accordance with one or more embodiments described herein.

Turning next to FIGS. 16-18, a detailed description is provided of additional context for the one or more embodiments described herein at FIGS. 1-15.

FIG. 16 and the following discussion are intended to provide a brief, general description of a suitable operating environment 1600 which can be comprised by, be associated with and/or be coupled to one or more computer and/or computing-based elements described herein with reference to any one or more of FIGS. 1-3. For example, such suitable operating environment 1600 can, in one or more embodiments, obtain and/or transmit a quantum job request (e.g., quantum job request 224) to the quantum system 201, manage a quantum job queue, and/or manage one or more classical operations in conjunction with the quantum system 201. Further, while one or more embodiments have been described above in the general context of computer-executable instructions that can run on one or more computers, those skilled in the art will recognize that one or more embodiments also can be implemented in combination with other program modules and/or as a combination of hardware and software.

Generally, program modules include routines, programs, components, data structures and/or the like, that perform particular tasks and/or implement particular abstract data types. Moreover, the inventive methods can be practiced with other computer system configurations, including single-processor or multiprocessor computer systems, mini-computers, mainframe computers, Internet of Things (IoT) devices, distributed computing systems, as well as personal computers, hand-held computing devices, microprocessor-based or programmable consumer electronics, and/or the like, each of which can be operatively coupled to one or more devices.

Computing devices typically include a variety of media, which can include computer-readable storage media, machine-readable storage media and/or communications media, which two terms are used herein differently from one another as follows. Computer-readable storage media or machine-readable storage media can be any available storage media that can be accessed by the computer and includes both volatile and nonvolatile media, removable and non-removable media. By way of example, but not limitation, computer-readable storage media and/or machine-readable storage media can be implemented in connection with any method or technology for storage of information such as computer-readable and/or machine-readable instructions, program modules, structured data and/or unstructured data.

Computer-readable storage media can include, but are not limited to, random access memory (RAM), read only memory (ROM), electrically erasable programmable read only memory (EEPROM), flash memory or other memory technology, compact disk read only memory (CD ROM), digital versatile disk (DVD), Blu-ray disc (BD) and/or other optical disk storage, magnetic cassettes, magnetic tape, magnetic disk storage and/or other magnetic storage devices, solid state drives or other solid state storage devices and/or other tangible and/or non-transitory media which can be used to store specified information. In this regard, the terms "tangible" or "non-transitory" herein as applied to storage, memory and/or computer-readable media, are to be understood to exclude only propagating transitory signals per se as modifiers and do not relinquish rights to all standard storage, memory and/or computer-readable media that are not only propagating transitory signals per se.

Computer-readable storage media can be accessed by one or more local or remote computing devices, e.g., via access requests, queries and/or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set and/or changed in such a manner as to encode information in one or more signals. By way of example, but not limitation, communication media can include wired media, such as a wired network, direct-wired connection and/or wireless media such as acoustic, RF, infrared and/or other wireless media.

With reference again to FIG. 16 the example operating environment 1600 can comprise a computer 1602, the computer 1602 including a processing unit 1606, a system memory 1604 and/or a system bus 1608.

Memory 1604 can store one or more computer and/or machine readable, writable and/or executable components and/or instructions that, when executed by processing unit 1606 (e.g., a classical processor, a quantum processor and/or like processor), can facilitate performance of operations defined by the executable component(s) and/or instruction(s). For example, memory 1604 can store computer and/or machine readable, writable and/or executable components and/or instructions that, when executed by processing unit 1606, can facilitate execution of the one or more functions described herein relating to non-limiting system 100, 200 and/or 300, as described herein with or without reference to the one or more figures of the one or more embodiments.

Memory 1604 can comprise volatile memory (e.g., random access memory (RAM), static RAM (SRAM), dynamic RAM (DRAM) and/or the like) and/or non-volatile memory (e.g., read only memory (ROM), programmable ROM (PROM), electrically programmable ROM (EPROM), electrically erasable programmable ROM (EEPROM) and/or the like) that can employ one or more memory architectures.

Processing unit 1606 can comprise one or more types of processors and/or electronic circuitry (e.g., a classical processor, a quantum processor and/or like processor) that can implement one or more computer and/or machine readable, writable and/or executable components and/or instructions that can be stored at memory 1604. For example, processing unit 1606 can perform one or more operations that can be specified by computer and/or machine readable, writable and/or executable components and/or instructions including, but not limited to, logic, control, input/output (I/O), arithmetic and/or the like. In one or more embodiments, processing unit 1606 can be any of one or more commercially available processors. In one or more embodiments, processing unit 1606 can comprise one or more central processing unit, multi-core processor, microprocessor, dual microprocessors, microcontroller, System on a Chip (SOC), array processor, vector processor, quantum processor and/or another type of processor. The examples of processing unit 1606 can be employed to implement one or more embodiments described herein.

The system bus 1608 can couple system components including, but not limited to, the system memory 1604 to the processing unit 1606. The system bus 1608 can comprise one or more types of bus structure that can further interconnect to a memory bus (with or without a memory controller), a peripheral bus and/or a local bus using one or more of a variety of commercially available bus architectures. The system memory 1604 can include ROM 1610 and/or RAM 1612. A basic input/output system (BIOS) can be stored in a non-volatile memory such as ROM, erasable programmable read only memory (EPROM) and/or EEPROM, which BIOS contains the basic routines that help to transfer information among elements within the computer 1602, such as during startup. The RAM 1612 can include a high-speed RAM, such as static RAM for caching data.

The computer 1602 can include an internal hard disk drive (HDD) 1614 (e.g., EIDE, SATA), one or more external storage devices 1616 (e.g., a magnetic floppy disk drive (FDD), a memory stick or flash drive reader, a memory card reader and/or the like) and/or a drive 1620, e.g., such as a solid state drive or an optical disk drive, which can read or write from a disk 1622, such as a CD-ROM disc, a DVD, a BD and/or the like. Additionally, and/or alternatively, where a solid-state drive is involved, disk 1622 could not be included, unless separate. While the internal HDD 1614 is illustrated as located within the computer 1602, the internal HDD 1614 can also be configured for external use in a suitable chassis (not shown). Additionally, while not shown in operating environment 1600, a solid-state drive (SSD) can be used in addition to, or in place of, an HDD 1614. The HDD 1614, external storage device(s) 1616 and drive 1620 can be connected to the system bus 1608 by an HDD interface 1624, an external storage interface 1626 and a drive interface 1628, respectively. The HDD interface 1624 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1602, the drives and storage media accommodate the storage of any data in a suitable digital format. Although the description of computer-readable storage media above refers to respective types of storage devices, other types of storage media which are readable by a computer, whether presently existing or developed in the future, can also be used in the example operating environment, and/or that any such storage media can contain computer-executable instructions for performing the methods described herein.

A number of program modules can be stored in the drives and RAM 1612, including an operating system 1630, one or more applications 1632, other program modules 1634 and/or program data 1636. All or portions of the operating system, applications, modules and/or data can also be cached in the RAM 1612. The systems and/or methods described herein can be implemented utilizing one or more commercially available operating systems and/or combinations of operating systems.

Computer 1602 can optionally comprise emulation technologies. For example, a hypervisor (not shown) or other intermediary can emulate a hardware environment for operating system 1630, and the emulated hardware can optionally be different from the hardware illustrated in FIG. 16. In a related embodiment, operating system 1630 can comprise one virtual machine (VM) of multiple VMs hosted at computer 1602. Furthermore, operating system 1630 can provide runtime environments, such as the JAVA runtime environment or the .NET framework, for applications 1632. Runtime environments are consistent execution environments that can allow applications 1632 to run on any operating system that includes the runtime environment. Similarly, operating system 1630 can support containers, and applications 1632 can be in the form of containers, which are lightweight, standalone, executable packages of software that include, e.g., code, runtime, system tools, system libraries and/or settings for an application.

Further, computer 1602 can be enabled with a security module, such as a trusted processing module (TPM). For instance, with a TPM, boot components hash next in time boot components and wait for a match of results to secured values before loading a next boot component. This process can take place at any layer in the code execution stack of computer 1602, e.g., applied at application execution level and/or at operating system (OS) kernel level, thereby enabling security at any level of code execution.

An entity can enter and/or transmit commands and/or information into the computer 1602 through one or more wired/wireless input devices, e.g., a keyboard 1638, a touch screen 1640 and/or a pointing device, such as a mouse 1642.

Other input devices (not shown) can include a microphone, an infrared (IR) remote control, a radio frequency (RF) remote control and/or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint and/or iris scanner, and/or the like. These and other input devices can be connected to the processing unit 1606 through an input device interface 1644 that can be coupled to the system bus 1608, but can be connected by other interfaces, such as a parallel port, an IEEE 1394 serial port, a game port, a USB port, an IR interface, a BLUETOOTH® interface and/or the like.

A monitor 1646 or other type of display device can be alternatively and/or additionally connected to the system bus 1608 via an interface, such as a video adapter 1648. In addition to the monitor 1646, a computer typically includes other peripheral output devices (not shown), such as speakers, printers and/or the like.

The computer 1602 can operate in a networked environment using logical connections via wired and/or wireless communications to one or more remote computers, such as a remote computer(s) 1650. The remote computer(s) 1650 can be a workstation, a server computer, a router, a personal computer, portable computer, microprocessor-based entertainment appliance, a peer device and/or other common network node, and typically includes many or all of the elements described relative to the computer 1602, although, for purposes of brevity, only a memory/storage device 1652 is illustrated. Additionally, and/or alternatively, the computer 1602 can be coupled (e.g., communicatively, electrically, operatively, optically and/or the like) to one or more external systems, sources and/or devices (e.g., classical and/or quantum computing devices, communication devices and/or like device) via a data cable (e.g., High-Definition Multimedia Interface (HDMI), recommended standard (RS) 232, Ethernet cable and/or the like).

In one or more embodiments, a network can comprise one or more wired and/or wireless networks, including, but not limited to, a cellular network, a wide area network (WAN) (e.g., the Internet), or a local area network (LAN). For example, one or more embodiments described herein can communicate with one or more external systems, sources and/or devices, for instance, computing devices (and vice versa) using virtually any specified wired or wireless technology, including but not limited to: wireless fidelity (Wi-Fi), global system for mobile communications (GSM), universal mobile telecommunications system (UMTS), worldwide interoperability for microwave access (WiMAX), enhanced general packet radio service (enhanced GPRS), third generation partnership project (3GPP) long term evolution (LTE), third generation partnership project 2 (3GPP2) ultra-mobile broadband (UMB), high speed packet access (HSPA), Zigbee and other 802.XX wireless technologies and/or legacy telecommunication technologies, BLUETOOTH®, Session Initiation Protocol (SIP), ZIGBEE®, RF4CE protocol, WirelessHART protocol, 6LoWPAN (IPv6 over Low power Wireless Area Networks), Z-Wave, an ANT, an ultra-wideband (UWB) standard protocol and/or other proprietary and/or non-proprietary communication protocols. In a related example, one or more embodiments described herein can include hardware (e.g., a central processing unit (CPU), a transceiver, a decoder, quantum hardware, a quantum processor and/or the like), software (e.g., a set of threads, a set of processes, software in execution, quantum pulse schedule, quantum circuit, quantum gates and/or the like) and/or a combination of hardware and/or software that facilitates communicating information among one or more embodiments described herein and external systems, sources and/or devices (e.g., computing devices, communication devices and/or the like).

The logical connections depicted include wired/wireless connectivity to a local area network (LAN) 1654 and/or larger networks, e.g., a wide area network (WAN) 1656. LAN and WAN networking environments can be commonplace in offices and companies and can facilitate enterprise-wide computer networks, such as intranets, all of which can connect to a global communications network, e.g., the Internet.

When used in a LAN networking environment, the computer 1602 can be connected to the local network 1654 through a wired and/or wireless communication network interface or adapter 1658. The adapter 1658 can facilitate wired and/or wireless communication to the LAN 1654, which can also include a wireless access point (AP) disposed thereon for communicating with the adapter 1658 in a wireless mode.

When used in a WAN networking environment, the computer 1602 can include a modem 1660 and/or can be connected to a communications server on the WAN 1656 via other means for establishing communications over the WAN 1656, such as by way of the Internet. The modem 1660, which can be internal and/or external and a wired and/or wireless device, can be connected to the system bus 1608 via the input device interface 1644. In a networked environment, program modules depicted relative to the computer 1602 or portions thereof can be stored in the remote memory/storage device 1652. The network connections shown are merely exemplary and one or more other means of establishing a communications link among the computers can be used.

When used in either a LAN or WAN networking environment, the computer 1602 can access cloud storage systems or other network-based storage systems in addition to, and/or in place of, external storage devices 1616 as described above, such as but not limited to, a network virtual machine providing one or more aspects of storage and/or processing of information. Generally, a connection between the computer 1602 and a cloud storage system can be established over a LAN 1654 or WAN 1656 e.g., by the adapter 1658 or modem 1660, respectively. Upon connecting the computer 1602 to an associated cloud storage system, the external storage interface 1626 can, such as with the aid of the adapter 1658 and/or modem 1660, manage storage provided by the cloud storage system as it would other types of external storage. For instance, the external storage interface 1626 can be configured to provide access to cloud storage sources as if those sources were physically connected to the computer 1602.

The computer 1602 can be operable to communicate with any wireless devices and/or entities operatively disposed in wireless communication, e.g., a printer, scanner, desktop and/or portable computer, portable data assistant, communications satellite, telephone and/or any piece of equipment or location associated with a wirelessly detectable tag (e.g., a kiosk, news stand, store shelf and/or the like). This can include Wireless Fidelity (Wi-Fi) and BLUETOOTH® wireless technologies. Thus, the communication can be a predefined structure as with a conventional network or simply an ad hoc communication between at least two devices.

The illustrated embodiments described herein can be employed relative to distributed computing environments (e.g., cloud computing environments), such as described below with respect to FIG. 17, where certain tasks are performed by remote processing devices that are linked through a communications network. In a distributed computing environment, program modules can be located both in local and/or remote memory storage devices.

For example, one or more embodiments described herein and/or one or more components thereof can employ one or more computing resources of the cloud computing environment 1750 described below with reference to the illustration 1700 of FIG. 17, and/or with reference to the one or more functional abstraction layers (e.g., quantum software and/or the like) described below with reference to FIG. 18, to execute one or more operations in accordance with one or more embodiments described herein. For example, cloud computing environment 1750 and/or one or more of the functional abstraction layers 1860, 1870, 1880 and/or 1890 can comprise one or more classical computing devices (e.g., classical computer, classical processor, virtual machine, server and/or the like), quantum hardware and/or quantum software (e.g., quantum computing device, quantum computer, quantum processor, quantum circuit simulation software, superconducting circuit and/or the like) that can be employed by one or more embodiments described herein and/or components thereof to execute one or more operations in accordance with one or more embodiments described herein. For instance, one or more embodiments described herein and/or components thereof can employ such one or more classical and/or quantum computing resources to execute one or more classical and/or quantum: mathematical function, calculation and/or equation; computing and/or processing script; algorithm; model (e.g., artificial intelligence (AI) model, machine learning (ML) model and/or like model); and/or other operation in accordance with one or more embodiments described herein. It is to be understood that although one or more embodiments described herein include a detailed description on cloud computing, implementation of the teachings recited herein are not limited to a cloud computing environment. Rather, one or more embodiments described herein are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines and/or services) that can be rapidly provisioned and released with minimal management effort or interaction with a provider of the service. This cloud model can include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but can specify location at a higher level of abstraction (e.g., country, state and/or datacenter).

Rapid elasticity: capabilities can be rapidly and elastically provisioned, in one or more cases automatically, to quickly scale out and rapidly released to quickly scale in. To the consumer, the capabilities available for provisioning can appear to be unlimited and can be purchased in any quantity at any time.

Measured service: cloud systems automatically control and optimize resource use by leveraging a metering capability at one or more levels of abstraction appropriate to the type of service (e.g., storage, processing, bandwidth and/or active user accounts). Resource usage can be monitored, controlled and/or reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage and/or individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems and/or storage, but has control over the deployed applications and possibly application hosting environment configurations.

Infrastructure as a Service (IaaS): the capability provided to the consumer is to provision processing, storage, networks and/or other fundamental computing resources where the consumer can deploy and run arbitrary software, which can include operating systems and applications. The consumer does not manage or control the underlying cloud infrastructure but has control over operating systems, storage, deployed applications and/or possibly limited control of select networking components (e.g., host firewalls).

Deployment Models are as follows:

Private cloud: the cloud infrastructure is operated solely for an organization. It can be managed by the organization or a third party and can exist on-premises or off-premises.

Community cloud: the cloud infrastructure is shared by several organizations and supports a specific community that has shared concerns (e.g., mission, security requirements, policy and/or compliance considerations). It can be managed by the organizations or a third party and can exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community or public) that remain unique entities but are bound together by standardized or proprietary technology that enables data and application portability (e.g., cloud bursting for load-balancing among clouds).

A cloud computing environment is service oriented with a focus on statelessness, low coupling, modularity and/or semantic interoperability. At the heart of cloud computing is an infrastructure that includes a network of interconnected nodes.

Moreover, the non-limiting systems 100, 200 and/or 300 and/or the example operating environment 1600 can be associated with and/or be included in a data analytics system, a data processing system, a graph analytics system, a graph processing system, a big data system, a social network system, a speech recognition system, an image recognition system, a graphical modeling system, a bioinformatics system, a data compression system, an artificial intelligence system, an authentication system, a syntactic pattern recognition system, a medical system, a health monitoring system, a network system, a computer network system, a communication system, a router system, a server system, a high availability server system (e.g., a Telecom server system), a Web server system, a file server system, a data server system, a disk array system, a powered insertion board system, a cloud-based system and/or the like. In accordance therewith, non-limiting system 100 and/or example operating environment 1600 can be employed to use hardware and/or software to solve problems that are highly technical in nature, that are not abstract and/or that cannot be performed as a set of mental acts by a human.

Referring now to details of one or more aspects illustrated at FIG. 17, the illustrative cloud computing environment 1750 is depicted. As shown, cloud computing environment 1750 includes one or more cloud computing nodes 1710 with which local computing devices used by cloud consumers, such as, for example, personal digital assistant (PDA) or cellular telephone 1754A, desktop computer 1754B, laptop computer 1754C and/or automobile computer system 1754N can communicate. Although not illustrated in FIG. 17, cloud computing nodes 1710 can further comprise a quantum platform (e.g., quantum computer, quantum hardware, quantum software and/or the like) with which local computing devices used by cloud consumers can communicate. Cloud computing nodes 1710 can communicate with one another. They can be grouped (not shown) physically or virtually, in one or more networks, such as Private, Community, Public, or Hybrid clouds as described hereinabove, or a combination thereof. This allows cloud computing environment 1750 to offer infrastructure, platforms and/or software as services for which a cloud consumer does not need to maintain resources on a local computing device. It is understood that the types of computing devices 1754A-N shown in FIG. 17 are intended to be illustrative only and that cloud computing nodes 1710 and cloud computing environment 1750 can communicate with any type of computerized device over any type of network and/or network addressable connection (e.g., using a web browser).

Referring now to details of one or more aspects illustrated at FIG. 18, a set 1800 of functional abstraction layers is shown, such as provided by cloud computing environment 1750 (FIG. 17). One or more embodiments described herein can be associated with, such as accessible via, one or more functional abstraction layers described below with reference to FIG. 18 (e.g., hardware and software layer 1860, virtualization layer 1870, management layer 1880 and/or workloads layer 1890). It should be understood in advance that the components, layers and/or functions shown in FIG. 18 are intended to be illustrative only and embodiments described herein are not limited thereto. As depicted, the following layers and/or corresponding functions are provided:

Hardware and software layer 1860 can include hardware and software components. Examples of hardware components include: mainframes 1861; RISC (Reduced Instruction Set Computer) architecture-based servers 1862; servers 1863; blade servers 1864; storage devices 1865; and/or networks and/or networking components 1866. In one or more embodiments, software components can include network application server software 1867, quantum platform routing software 1868; and/or quantum software (not illustrated in FIG. 18).

Virtualization layer 1870 can provide an abstraction layer from which the following examples of virtual entities can be provided: virtual servers 1871; virtual storage 1872; virtual networks 1873, including virtual private networks; virtual applications and/or operating systems 1874; and/or virtual clients 1875.

In one example, management layer 1880 can provide the functions described below. Resource provisioning 1881 can provide dynamic procurement of computing resources and other resources that can be utilized to perform tasks within the cloud computing environment. Metering and Pricing 1882 can provide cost tracking as resources are utilized within the cloud computing environment, and/or billing and/or invoicing for consumption of these resources. In one example, these resources can include one or more application software licenses. Security can provide identity verification for cloud consumers and/or tasks, as well as protection for data and/or other resources. User (or entity) portal 1883 can provide access to the cloud computing environment for consumers and system administrators. Service level management 1884 can provide cloud computing resource allocation and/or management such that required service levels are met. Service Level Agreement (SLA) planning and fulfillment 1885 can provide pre-arrangement for, and procurement of, cloud computing resources for which a future requirement is anticipated in accordance with an SLA.

Workloads layer 1890 can provide examples of functionality for which the cloud computing environment can be utilized. Non-limiting examples of workloads and functions which can be provided from this layer include: mapping and navigation 1891; software development and lifecycle management 1892; virtual classroom education delivery 1893; data analytics processing 1894; transaction processing 1895; and/or application transformation software 1896.

The embodiments described herein can be directed to one or more of a system, a method, an apparatus and/or a computer program product at any possible technical detail level of integration. The computer program product can include a computer readable storage medium (or media) having computer readable program instructions thereon for causing a processor to carry out aspects of the one or more embodiments described herein. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a superconducting storage device and/or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon and/or any suitable combination of the foregoing. A computer readable storage medium, as used herein, is not to be construed as being transitory signals per se, such as radio waves and/or other freely propagating electromagnetic waves, electromagnetic waves propagating through a waveguide and/or other transmission media (e.g., light pulses passing through a fiber-optic cable), and/or electrical signals transmitted through a wire.

Computer readable program instructions described herein can be downloaded to respective computing/processing devices from a computer readable storage medium and/or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the one or more embodiments described herein can be assembler instructions, instruction-set-architecture (ISA) instructions, machine instructions, machine dependent instructions, microcode, firmware instructions, state-setting data, configuration data for integrated circuitry, and/or source code and/or object code written in any combination of one or more programming languages, including an object oriented programming language such as Smalltalk, C++ or the like, and/or procedural programming languages, such as the "C" programming language and/or similar programming languages. The computer readable program instructions can execute entirely on a computer, partly on a computer, as a stand-alone software package, partly on a computer and/or partly on a remote computer or entirely on the remote computer and/or server. In the latter scenario, the remote computer can be connected to a computer through any type of network, including a local area network (LAN) and/or a wide area network (WAN), and/or the connection can be made to an external computer (for example, through the Internet using an Internet Service Provider). In one or more embodiments, electronic circuitry including, for example, programmable logic circuitry, field-programmable gate arrays (FPGA) and/or programmable logic arrays (PLA) can execute the computer readable program instructions by utilizing state information of the computer readable program instructions to personalize the electronic circuitry, in order to perform aspects of the one or more embodiments described herein.

Aspects of the one or more embodiments described herein are described with reference to flowchart illustrations and/or block diagrams of methods, apparatus (systems), and computer program products according to one or more embodiments described herein. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer and/or other programmable data processing apparatus to produce a machine, such that the instructions, which execute via the processor of the computer or other programmable data processing apparatus, can create means for implementing the functions/acts specified in the flowchart and/or block diagram block or blocks. These computer readable program instructions can also be stored in a computer readable storage medium that can direct a computer, a programmable data processing apparatus and/or other devices to function in a particular manner, such that the computer readable storage medium having instructions stored therein can comprise an article of manufacture including instructions which can implement aspects of the function/act specified in the flowchart and/or block diagram block or blocks. The computer readable program instructions can also be loaded onto a computer, other programmable data processing apparatus and/or other device to cause a series of operational acts to be performed on the computer, other programmable apparatus and/or other device to produce a computer implemented process, such that the instructions which execute on the computer, other programmable apparatus and/or other device implement the functions/acts specified in the flowchart and/or block diagram block or blocks.

The flowcharts and block diagrams in the figures illustrate the architecture, functionality and/or operation of possible implementations of systems, computer-implementable methods and/or computer program products according to one or more embodiments described herein. In this regard, each block in the flowchart or block diagrams can represent a module, segment and/or portion of instructions, which comprises one or more executable instructions for implementing the specified logical function(s). In one or more alternative implementations, the functions noted in the blocks can occur out of the order noted in the Figures. For example, two blocks shown in succession can be executed substantially concurrently, and/or the blocks can sometimes be executed in the reverse order, depending upon the functionality involved. It will also be noted that each block of the block diagrams and/or flowchart illustration, and/or combinations of blocks in the block diagrams and/or flowchart illustration, can be implemented by special purpose hardware-based systems that can perform the specified functions and/or acts and/or carry out one or more combinations of special purpose hardware and/or computer instructions.

While the subject matter has been described above in the general context of computer-executable instructions of a computer program product that runs on a computer and/or computers, those skilled in the art will recognize that the one or more embodiments herein also can be implemented in combination with one or more other program modules. Generally, program modules include routines, programs, components, data structures and/or the like that perform particular tasks and/or implement particular abstract data types. Moreover, the inventive computer-implemented methods can be practiced with other computer system configurations, including single-processor and/or multiprocessor computer systems, mini-computing devices, mainframe computers, as well as computers, hand-held computing devices (e.g., PDA, phone), microprocessor-based or programmable consumer and/or industrial electronics and/or the like. The illustrated aspects can also be practiced in distributed computing environments in which tasks are performed by remote processing devices that are linked through a communications network. One or more, if not all aspects of the one or more embodiments described herein can be practiced on stand-alone computers. In a distributed computing environment, program modules can be located in local and/or remote memory storage devices.

As used in this application, the terms "component," "system," "platform," "interface," and/or the like, can refer to and/or can include a computer-related entity or an entity related to an operational machine with one or more specific functionalities. The entities described herein can be either hardware, a combination of hardware and software, software, or software in execution. For example, a component can be, but is not limited to being, a process running on a processor, a processor, an object, an executable, a thread of execution, a program and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system and/or across a network such as the Internet with other systems via the signal). As another example, a component can be an apparatus with specific functionality provided by mechanical parts operated by electric or electronic circuitry, which is operated by a software and/or firmware application executed by a processor. In such a case, the processor can be internal and/or external to the apparatus and can execute at least a part of the software and/or firmware application. As yet another example, a component can be an apparatus that provides specific functionality through electronic components without mechanical parts, where the electronic components can include a processor and/or other means to execute software and/or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter described herein is not limited by such examples. In addition, any aspect or design described herein as an "example" and/or "exemplary" is not necessarily to be construed as preferred or advantageous over other aspects or designs, nor is it meant to preclude equivalent exemplary structures and/or techniques known to those of ordinary skill in the art.

As it is employed in the subject specification, the term "processor" can refer to substantially any computing processing unit and/or device comprising, but not limited to, single-core processors; single-processors with software multithread execution capability; multi-core processors; multi-core processors with software multithread execution capability; multi-core processors with hardware multithread technology; parallel platforms; and/or parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, and/or any combination thereof designed to perform the functions described herein. Further, processors can exploit nano-scale architectures such as, but not limited to, molecular and quantum-dot based transistors, switches and/or gates, in order to optimize space usage and/or to enhance performance of related equipment. A processor can be implemented as a combination of computing processing units.

Herein, terms such as "store," "storage," "data store," data storage," "database," and substantially any other information storage component relevant to operation and functionality of a component are utilized to refer to "memory components," entities embodied in a "memory," or components comprising a memory. Memory and/or memory components described herein can be either volatile memory or nonvolatile memory or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory and/or nonvolatile random access memory (RAM) (e.g., ferroelectric RAM (FeRAM). Volatile memory can include RAM, which can act as external cache memory, for example. By way of illustration and not limitation, RAM can be available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM) and/or Rambus dynamic RAM (RDRAM). Additionally, the described memory components of systems and/or computer-implemented methods herein are intended to include, without being limited to including, these and/or any other suitable types of memory.

What has been described above includes mere examples of systems and computer-implemented methods. It is, of course, not possible to describe every conceivable combination of components and/or computer-implemented methods for purposes of describing the one or more embodiments, but one of ordinary skill in the art can recognize that many further combinations and/or permutations of the one or more embodiments are possible. Furthermore, to the extent that the terms "includes," "has," "possesses," and the like are used in the detailed description, claims, appendices and/or drawings such terms are intended to be inclusive in a manner similar to the term "comprising" as "comprising" is interpreted when employed as a transitional word in a claim.

The descriptions of the one or more embodiments have been presented for purposes of illustration but are not intended to be exhaustive or limited to the embodiments described herein. Many modifications and variations will be apparent to those of ordinary skill in the art without departing from the scope and spirit of the described embodiments. The terminology used herein was chosen to best explain the principles of the embodiments, the practical application and/or technical improvement over technologies found in the marketplace, and/or to enable others of ordinary skill in the art to understand the embodiments described herein.

What is claimed is:

1. A system, comprising:
   a memory that stores computer executable components; and
   a processor that executes at least one of the computer executable components that:
   transpiles a quantum circuit into a reduced quantum circuit that maintains a same number of terms to be measured as the quantum circuit and has at least one of a reduced quantum of gates or a reduced depth as compared to the quantum circuit, wherein the transpiling comprises:

decomposing an exponential of a first Pauli operator of 1 to n Pauli operators of the quantum circuit; and performing a first Clifford transformation of a primary operator of the quantum circuit, wherein the primary operator comprises a linear combination of additional Pauli operators, and wherein the first Clifford transformation employs a result of the decomposition of the exponential of the first Pauli operator.

2. The system of claim 1, wherein the transpiling further comprises:

performing additional Clifford transformations of exponentials of other Pauli operators of the 1 to n Pauli operators by employing the result of the decomposition.

3. The system of claim 2, wherein the transpiling further comprises:

performing one or more additional first iterations of decomposition of exponentials of additional ones of the 1 to n Pauli operators, performing one or more additional second iterations of Clifford transformations of iterative revisions of the primary operator, and performing one or more additional third iterations of Clifford transformations of iterative revisions of exponentials of ones of the additional ones of the 1 to n Pauli operators, for which exponential decomposition has not yet been performed.

4. The system of claim 3, wherein the transpiling further comprises:

performing the one or more additional first, additional second, and additional third iterations until all exponentials of the Pauli operators of the 1 to n Pauli operators have been decomposed, one at a time, with corresponding Clifford transformations having been performed.

5. The system of claim 1, wherein the decomposing comprises decomposing the exponential of the first Pauli operator into a first non-Clifford operator and a first Clifford operator.

6. The system of claim 1, wherein the performing the first Clifford transformation comprises using a first Clifford operator resulting from the decomposition of the exponential of the first Pauli operator.

7. The system of claim 1, wherein the transpiling further comprises:

prior to the decomposition of the exponential of the first Pauli operator being performed, permutating identity operators of one or more of the 1 to n Pauli operators, of the quantum circuit, towards ends of respective strings of the one or more of the 1 to n Pauli operators.

8. A computer-implemented method, comprising:

transpiling, by a system operatively coupled to at least one processor, a quantum circuit into a reduced quantum circuit that maintains a same number of terms to be measured as the quantum circuit and has at least one of a reduced quantum of gates or a reduced depth as compared to the quantum circuit, wherein the transpiling comprises:

performing decomposition of an exponential of a first Pauli operator of 1 to n Pauli operators of the quantum circuit; and performing a first Clifford transformation of a primary operator of the quantum circuit, wherein the primary operator comprises a linear combination of primary Pauli operators, and wherein the first Clifford transformation employs a result of the decomposition of the exponential of the first Pauli operator.

9. The computer-implemented method of claim 8, wherein the transpiling further comprises:

performing additional Clifford transformations of exponentials of other Pauli operators of the 1 to n Pauli operators by employing the result of the decomposition.

10. The computer-implemented method of claim 9, wherein the transpiling further comprises:

performing one or more additional first iterations of decomposition of exponentials of additional ones of the 1 to n Pauli operators;

performing one or more additional second iterations of Clifford transformations of iterative revisions of the primary operator; and performing one or more additional third iterations of Clifford transformations of iterative revisions of exponentials of ones of the additional ones of the 1 to n Pauli operators, for which exponential decomposition has not yet been performed.

11. The computer-implemented method of claim 10, wherein the transpiling further comprises:

performing the one or more additional first, additional second, and additional third iterations until all exponentials of the Pauli operators of the 1 to n Pauli operators have been decomposed, one at a time, with corresponding Clifford transformations having been performed.

12. The computer-implemented method of claim 8, wherein the decomposing further comprises decomposing the exponential of the first Pauli operator into a first non-Clifford operator and a first Clifford operator.

13. The computer-implemented method of claim 8, wherein the performing the first Clifford transformation comprises using a first Clifford operator resulting from the decomposition of the exponential of the first Pauli operator.

14. The computer-implemented method of claim 8, wherein the transpiling further comprises:

prior to performing the decomposition of the first Pauli operator, permutating identity operators of one or more of the 1 to n Pauli operators, of the quantum circuit, towards ends of respective strings of the one or more of the 1 to n Pauli operators.

15. The computer-implemented method of claim 8, further comprising:

executing, by the system, the reduced quantum circuit on a quantum system.

16. A computer program product facilitating a process to reduce a quantum circuit, the computer program product comprising a non-transitory computer readable storage medium having program instructions embodied therewith, the program instructions executable by a processor to cause the processor to:

transpile the quantum circuit into a reduced quantum circuit that maintains a same number of terms to be measured as the quantum circuit and has at least one of a reduced quantum of gates or a reduced depth as compared to the quantum circuit, wherein the transpiling comprises:

performing decomposition of an exponential of a first Pauli operator of 1 to n Pauli operators of the quantum circuit; and performing a first Clifford transformation of a primary operator of the quantum circuit, wherein the primary operator comprises a linear combination of primary Pauli operators, and wherein the first Clifford transformation employs a result of the decomposition of the exponential of the first Pauli operator.

17. The computer program product of claim 16, wherein the transpiling further comprises:

performing additional Clifford transformations of exponentials of other Pauli operators of the 1 to n Pauli operators by employing the result of the decomposition.

18. The computer program product of claim 17, wherein the transpiling further comprises:

performing one or more additional first iterations of decomposition of exponentials of additional ones of the 1 to n Pauli operators;

performing one or more additional second iterations of Clifford transformations of iterative revisions of the primary operator; and performing one or more additional third iterations of Clifford transformations of iterative revisions of exponentials of ones of the additional ones of the 1 to n Pauli operators, for which exponential decomposition has not yet been performed.

19. The computer program product of claim 18, wherein the transpiling further comprises:

performing the one or more additional first, additional second, and additional third iterations until all exponentials of the Pauli operators of the 1 to n Pauli operators have been decomposed, one at a time, with corresponding Clifford transformations having been performed.

20. The computer program product of claim 16, wherein the performing the first Clifford transformation comprises using a first Clifford operator resulting from the decomposition of the exponential of the first Pauli operator.

* * * * *